United States Patent
Kuhara

(10) Patent No.: US 11,837,097 B2
(45) Date of Patent: Dec. 5, 2023

(54) METHOD OF DISPLAYING FLIGHT ROUTE OF UNMANNED AERIAL VEHICLE THAT FLIES AUTONOMOUSLY, TERMINAL, AND NON-TRANSITORY COMPUTER-READABLE RECORDING MEDIUM STORING PROGRAM

(71) Applicant: PANASONIC INTELLECTUAL PROPERTY CORPORATION OF AMERICA, Torrance, CA (US)

(72) Inventor: Shunsuke Kuhara, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 39 days.

(21) Appl. No.: 17/570,064

(22) Filed: Jan. 6, 2022

(65) Prior Publication Data

US 2022/0165166 A1    May 26, 2022

Related U.S. Application Data

(63) Continuation of application No. 16/862,713, filed on Apr. 30, 2020, now Pat. No. 11,257,380, which is a
(Continued)

(30) Foreign Application Priority Data

Oct. 27, 2015  (JP) ................................ 2015-210331
Jun. 22, 2016  (JP) ................................ 2016-123243

(51) Int. Cl.
G01C 21/20    (2006.01)
G08G 5/00    (2006.01)
(Continued)

(52) U.S. Cl.
CPC ........... *G08G 5/0034* (2013.01); *G01C 21/20* (2013.01); *G05D 1/0016* (2013.01); *G06F 3/041* (2013.01);
(Continued)

(58) Field of Classification Search
CPC .. G08G 5/0034; G08G 5/0013; G08G 5/0026; G08G 5/0039; G08G 5/0047;
(Continued)

(56) References Cited

U.S. PATENT DOCUMENTS 6,064,939 A    5/2000  Nishida et al.
2011/0046817 A1    2/2011  Hamke
(Continued)

FOREIGN PATENT DOCUMENTS

CN    102804240    11/2012
CN    103575269 A    2/2014
(Continued)

OTHER PUBLICATIONS

International Search Report of PCT application No. PCT/JP2016/003143 dated Sep. 27, 2016.
(Continued)

*Primary Examiner* — Peter D Nolan
*Assistant Examiner* — Demetra R Smith-Stewart
(74) *Attorney, Agent, or Firm* — GREENBLUM & BERNSTEIN, P.L.C.

(57) ABSTRACT

A flight route control method of an unmanned aerial vehicle includes: accepting, by a touch panel, an input of a departure point and a waypoint that the unmanned aerial vehicle will pass; receiving a predetermined time, indicating an end of a time period in which the unmanned aerial vehicle is permitted to fly; generating a flight route passing through the departure point and the waypoint; determining whether or not an arrival time to the waypoint is later than the prede-
(Continued)

termined time; not accepting the waypoint for the generated flight route when the arrival time is later than the predetermined time; accepting the waypoint for the generated flight route when the arrival time is not later than the predetermined time; and transmitting a control command to the unmanned aerial vehicle, the control command controlling the unmanned aerial vehicle to fly according to the generated flight route.

12 Claims, 19 Drawing Sheets

Related U.S. Application Data continuation of application No. 15/841,506, filed on Dec. 14, 2017, now Pat. No. 10,685,573, which is a continuation of application No. PCT/JP2016/003143, filed on Jun. 30, 2016.

(60) Provisional application No. 62/193,660, filed on Jul. 17, 2015.

(51) Int. Cl.
| | | |
|---|---|---|
| *B64C 39/02* | (2023.01) | |
| *G05D 1/00* | (2006.01) | |
| *G06F 3/041* | (2006.01) | |
| *B64U 10/13* | (2023.01) | |
| *B64U 50/19* | (2023.01) | |

(52) U.S. Cl.
CPC ......... *G08G 5/0013* (2013.01); *G08G 5/0026* (2013.01); *G08G 5/0039* (2013.01); *G08G 5/0047* (2013.01); *G08G 5/0069* (2013.01); *B64C 39/024* (2013.01); *B64U 10/13* (2023.01); *B64U 50/19* (2023.01); *B64U 2201/104* (2023.01); *B64U 2201/20* (2023.01)

(58) Field of Classification Search
CPC .... G08G 5/0069; G01C 21/20; G05D 1/0016; G06F 3/041; B64U 10/13; B64U 2201/20; B64U 50/19; B64U 2201/104; B64C 39/024
See application file for complete search history.

(56) References Cited

U.S. PATENT DOCUMENTS

| | | |
|---|---|---|
| 2012/0316773 A1 | 12/2012 | Sukenari |
| 2014/0028476 A1 | 1/2014 | Kolbe et al. |
| 2014/0379253 A1 | 12/2014 | Ota et al. |
| 2015/0066248 A1 | 3/2015 | Arbeit |
| 2015/0142211 A1 | 5/2015 | Shehata |
| 2015/0254988 A1 | 9/2015 | Wang |
| 2015/0336668 A1 | 11/2015 | Pasko |
| 2016/0253907 A1 | 9/2016 | Taveira |
| 2016/0370800 A1 | 12/2016 | Chau |
| 2019/0114925 A1 | 4/2019 | Schulman |

FOREIGN PATENT DOCUMENTS

| | | | |
|---|---|---|---|
| CN | 103748431 | | 4/2014 |
| JP | 10-241100 | | 9/1998 |
| JP | 11-201766 | | 7/1999 |
| JP | 2000-258177 | | 9/2000 |
| JP | 2002-211494 | A | 7/2002 |
| JP | 2008-105591 | | 5/2008 |
| JP | 2009-031084 | | 2/2009 |
| JP | 2010-152834 | | 7/2010 |
| JP | 2014-016324 | | 1/2014 |
| JP | 2014-145748 | | 8/2014 |
| KR | 20130009894 | A  * | 1/2013 |
| WO | 2011/114635 | | 9/2011 |

OTHER PUBLICATIONS

English Translation of Chinese Search Report dated Oct. 30, 2020 for the related Chinese Patent Application No. 201680026930.1.

* cited by examiner

METHOD OF DISPLAYING FLIGHT ROUTE OF UNMANNED AERIAL VEHICLE THAT FLIES AUTONOMOUSLY, TERMINAL, AND NON-TRANSITORY COMPUTER-READABLE RECORDING MEDIUM STORING PROGRAM

CROSS REFERENCE TO RELATED APPLICATIONS

The present application is a continuation of U.S. application Ser. No. 16/862,713, filed Apr. 30, 2020, which is a continuation of U.S. application Ser. No. 15/841,506, filed Dec. 14, 2017, now U.S. Pat. No. 10,685,573 issued Jun. 16, 2020, which is a continuation of International Application No. PCT/JP2016/003143, filed Jun. 30, 2016, which claims benefit of U.S. Provisional Application No. 62/193,660, filed Jul. 17, 2015, and Japanese Patent Application Nos. 2015-210331, filed Oct. 27, 2015, and 2016-123243, filed Jun. 22, 2016. The entire disclosures of the above-identified applications are incorporated herein by reference in their entireties.

BACKGROUND

1. Technical Field

The present disclosure relates to a method of displaying a flight route of an unmanned aerial vehicle that flies autonomously, a terminal, and a non-transitory computer-readable recording medium storing a program.

2. Description of the Related Art

In recent years, small unmanned aerial vehicles that autonomously fly predetermined flight routes have been developed. These unmanned aerial vehicles have multiple propellers, and can freely fly through the air by controlling the rotations of each of the multiple propellers. The unmanned aerial vehicles can thus autonomously fly along predetermined flight routes.

For example, Japanese Unexamined Patent Application Publication No. 2010-152834 describes a remote operation device and an unmanned moving object. The remote operation device includes a travel instruction unit that gives travel instructions by superimposing and setting a turning position regarding which an unmanned moving object is to turn, and an operating icon correlated to a travel direction at this turning position, at an instruction position of an image on a display unit. The unmanned moving object includes a route planning unit that plans a travel route for autonomous travel based on the turning position instructed by the travel instruction unit and the travel direction at the turning position, a speed planning unit that plans travel speed of the unmanned moving object in accordance with the travel route, and an autonomous travel unit that causes the unmanned moving object to travel according to the planned travel route and travel speed. However, further improvement has been necessary in the above-described conventional technology.

SUMMARY

In one general aspect, the techniques disclosed here feature a method for a terminal that displays a flight route of an unmanned aerial vehicle that performs autonomous flight. The method includes accepting, by an input, input of a departure point and at least one waypoint that the unmanned aerial vehicle will pass, and displaying, on a display, a flight route passing through the departure point and the waypoint, and an end time arrival point at which the unmanned aerial vehicle will arrive at an end time of a time zone in which flight of the unmanned aerial vehicle is permitted.

According to the present disclosure, the user can be prompted to set a flight route such that the unmanned aerial vehicle returns by the end time of a time zone in which flight of the unmanned aerial vehicle is permitted, and thereby can prevent the unmanned aerial vehicle from flying after the end time.

It should be noted that these general or specific aspects may be realized by a device, system, method, integrated circuit, computer program, or computer-readable recording medium such as a Compact Disc Read-Only Memory (CD-ROM), and so forth, and may be realized by any combination of a device, system, method, integrated circuit, computer program, and recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
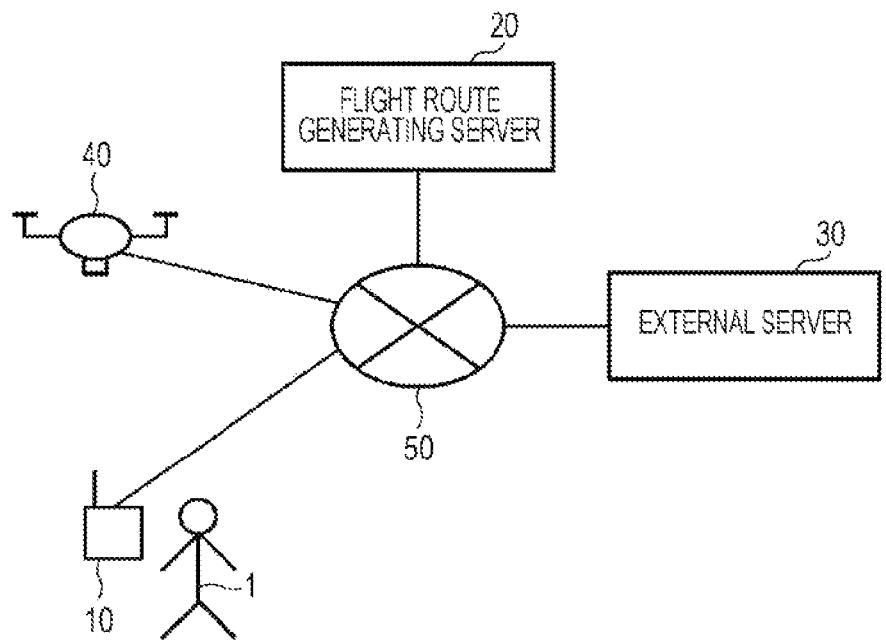
FIG. 1 is a diagram illustrating the configuration of a flight control system according to a first embodiment of the present disclosure.

Underlying Knowledge Forming Basis of the Present Disclosure

Unmanned aerial vehicles can fly in the sky, as mentioned earlier, so restrictions regarding various types of unmanned aerial vehicles are being studied. For example, restrictions forbidding flying unmanned aerial vehicles at night, and only permitting flying unmanned aerial vehicles during the daytime, are being studied. However, conventional unmanned moving objects plan travel routes for autonomous travel based on turning positions and travel direction, but there has been no disclosure regarding autonomous travel of unmanned moving objects only in time zones where travel of unmanned moving objects is permitted.

The present inventor has reached the aspects of the present disclosure in light of the above studies.

A flight route generating method according to an aspect of the present disclosure is a flight route generating method that generates a flight route of an unmanned aerial vehicle that performs autonomous flight. The method includes accepting, by an input, input of a departure point and waypoints that the unmanned aerial vehicle will pass, and displaying, on a display, a flight route passing through the departure point and the waypoint, and an end time arrival point at which the unmanned aerial vehicle will arrive at an end time of a time zone in which flight of the unmanned aerial vehicle is permitted.

According to this configuration, input of the departure point and waypoint that the unmanned aerial vehicle will pass is accepted. The end time arrival point at which the unmanned aerial vehicle will arrive at the end time of the time zone in which flight of the unmanned aerial vehicle is permitted is displayed on the flight route passing through the departure point and the waypoint.

Thus, the end time arrival point at which the unmanned aerial vehicle will arrive at the end time of the time zone in which flight of the unmanned aerial vehicle is permitted, is displayed on the flight route, so the user can be prompted to set the flight route to return by the end time of the time zone in which flight of the unmanned aerial vehicle is permitted, and the unmanned aerial vehicle can be prevented from flying after the end time.

The flight route may include a first partial flight route from the departure point to the end time arrival point, and a second partial flight route beyond the end time arrival point, that are displayed in different modes on the flight route.

According to this configuration, the first partial flight route from the departure point to the end time arrival point, and the second partial flight route beyond the end time arrival point, are displayed in different modes on the flight route, so the first partial flight route in which flight can be performed and the second partial flight route in which flight cannot be performed can be easily distinguished.

The waypoints may include a first waypoint that the unmanned aerial vehicle passes, and a second waypoint that the unmanned aerial vehicle passes next after the first waypoint. The flight route may include a third partial flight route up to a waypoint immediately before the end time arrival point, and a fourth partial flight route beyond the waypoint immediately before the end time arrival point, that are displayed in different modes.

According to this configuration, the waypoints include a first waypoint that the unmanned aerial vehicle passes, and a second waypoint that the unmanned aerial vehicle passes next after the first waypoint. The flight route includes a third partial flight route up to a waypoint immediately before the end time arrival point, and a fourth partial flight route beyond the waypoint immediately before the end time arrival point, that are displayed in different modes.

Accordingly, the third partial flight route up to a waypoint immediately before the end time arrival point, and the fourth partial flight route beyond the waypoint immediately before the end time arrival point, are displayed in different modes, so the third partial flight route in which flight can be performed and the fourth partial flight route in which flight cannot be performed can be easily distinguished.

The waypoint may include a first waypoint that the unmanned aerial vehicle passes, and a second waypoint that the unmanned aerial vehicle passes next after the first waypoint. The first waypoint may be a point that the unmanned aerial vehicle can reach by the end time, and the second waypoint a point that the unmanned aerial vehicle cannot reach by the end time, that are displayed in different modes.

According to this configuration, the waypoint includes a first waypoint that the unmanned aerial vehicle passes, and a second waypoint that the unmanned aerial vehicle passes next after the first waypoint. The first waypoint that is a point that the unmanned aerial vehicle can reach by the end time of the time zone in which the unmanned aerial vehicle is permitted to fly, and the second waypoint that is a point that the unmanned aerial vehicle cannot reach by the end time, are displayed in different modes.

Thus, the first waypoint that is a point that the unmanned aerial vehicle can reach by the end time of the time zone in which the unmanned aerial vehicle is permitted to fly and the second waypoint that is a point that the unmanned aerial vehicle cannot reach by the end time are displayed in different modes, so the user can be prompted to set the flight route to return by the end time of the time zone in which flight of the unmanned aerial vehicle is permitted, and the unmanned aerial vehicle can be prevented from flying after the end time.

The method may further include accepting, by the input, input of a departure time of departing the departure point, and displaying, on the display, a first planned arrival time at which the unmanned aerial vehicle will reach the first waypoint, and a second planned arrival time at which the unmanned aerial vehicle will reach the second waypoint.

According to this configuration, input of the departure time of departing the departure point is further accepted. The first planned arrival time at which the unmanned aerial vehicle will reach the first waypoint, and the second planned arrival time at which the unmanned aerial vehicle will reach the second waypoint, are then displayed. Accordingly, the user can confirm the first planned arrival time at which the unmanned aerial vehicle will reach the first waypoint, and the second planned arrival time at which the unmanned aerial vehicle will reach the second waypoint.

The method may further include displaying, on the display, a planned arrival time at which the unmanned aerial vehicle will reach the waypoint, and a planned return time at which the unmanned aerial vehicle will return from the waypoint to the departure point, which is a destination point that the unmanned aerial vehicle will finally arrive at.

According to this configuration, then planned arrival time at which the unmanned aerial vehicle will reach the waypoint, and the planned return time at which the unmanned aerial vehicle will return from the waypoint to the departure point, are displayed, so the user can easily confirm whether or not the unmanned aerial vehicle can return to the departure point by the end time.

Input of the waypoint may not be accepted when inputting the waypoint, in a case where the planned return time is later than the end time.

According to this configuration, input of the waypoint is not accepted when inputting the waypoint, in a case where the planned return time is later than the end time. Accordingly, the unmanned aerial vehicle can be prevented from flying after the end time, in a sure manner.

The method may further include notifying a user that the planned return time will be later than the end time when inputting the waypoint, in a case where the planned return time is later than the end time.

According to this configuration, the user is notified that the planned return time will be later than the end time when inputting the waypoint, in a case where the planned return time is later than the end time. Accordingly, the user can set the flight route so that the planned return time does not go past the end time.

Input of the second waypoint may be accepted even if the planned arrival time at which the unmanned aerial vehicle will reach the second waypoint is later than the end time, in a case where permission information has been acquired that permits the unmanned aerial vehicle to fly even after the end time.

According to this configuration, input of the second waypoint is accepted even if the planned arrival time at which the unmanned aerial vehicle will reach the second waypoint is later than the end time, in a case where permission information has been acquired that permits the unmanned aerial vehicle to fly even after the end time.

Thus, in a case where permitted, the second waypoint can be input even if the planned arrival time is later than the end time, and the unmanned aerial vehicle can be flown after the end time.

The method may further include displaying, on the display, a maximum flight range of the unmanned aerial vehicle from a first planned arrival time at which the unmanned aerial vehicle will reach the first waypoint until the end time, when inputting the first waypoint.

According to this configuration, the maximum flight range of the unmanned aerial vehicle, from the first planned arrival time at which the unmanned aerial vehicle will reach the first waypoint until the end time is displayed when inputting the first waypoint. Thus, the maximum flight range from the first waypoint to the end time is displayed when setting the flight route, so the user can be prompted to set the flight route to return by the end time, and the unmanned aerial vehicle can be prevented from flying after the end time.

The method may further include acquiring a remaining charge of a battery that the unmanned aerial vehicle has, and displaying, on the display, a maximum flight range of the unmanned aerial vehicle from the first waypoint on the remaining charge, when inputting the first waypoint.

According to this configuration, the remaining charge of the battery that the unmanned aerial vehicle has is acquired, and the maximum flight range of the unmanned aerial vehicle from the first waypoint on the remaining charge is displayed when inputting the first waypoint. Thus, the maximum flight range that can be covered with the remaining battery charge can is displayed when setting the flight route, so a situation where the battery dies while in flight and the unmanned aerial vehicle cannot fly any more can be prevented.

A non-transitory computer-readable recording medium according to another aspect of the present disclosure stores a program that controls a terminal that displays a flight route of an unmanned aerial vehicle that performs autonomous flight. When executed by a computer of the terminal, the program causes the computer to execute a method including accepting input of a departure point and a waypoint that the unmanned aerial vehicle will pass, and displaying, on a display, a flight route passing through the departure point and the waypoint, and an end time arrival point at which the unmanned aerial vehicle will arrive at an end time of a time zone in which flight of the unmanned aerial vehicle is permitted.

According to this configuration, input of the departure point and waypoint that the unmanned aerial vehicle will pass is accepted. The end time arrival point at which the unmanned aerial vehicle will arrive at the end time of the time zone in which flight of the unmanned aerial vehicle is permitted is displayed on the flight route passing through the departure point and the waypoint.

Thus, the end time arrival point at which the unmanned aerial vehicle will arrive at the end time of the time zone in which flight of the unmanned aerial vehicle is permitted, is displayed on the flight route, so the user can be prompted to set the flight route to return by the end time of the time zone in which flight of the unmanned aerial vehicle is permitted, and the unmanned aerial vehicle can be prevented from flying after the end time.

A flight route display device according to another aspect of the present disclosure is a flight route display device that displays a flight route of an unmanned aerial vehicle that performs autonomous flight. The flight route display device includes an input that accepts user input, and a display that displays information. The input unit accepts input of a departure point and a waypoint that the unmanned aerial vehicle will pass, and the display unit displays an end time arrival point at which the unmanned aerial vehicle will arrive at an end time of a time zone in which flight of the unmanned aerial vehicle is permitted, upon a flight route passing through the departure point and the waypoint.

According to this configuration, input of the departure point and waypoint that the unmanned aerial vehicle will pass is accepted. The end time arrival point at which the unmanned aerial vehicle will arrive at the end time of the time zone in which flight of the unmanned aerial vehicle is permitted is displayed on the flight route passing through the departure point and the waypoint.

Thus, the end time arrival point at which the unmanned aerial vehicle will arrive at the end time of the time zone in which flight of the unmanned aerial vehicle is permitted, is displayed on the flight route, so the user can be prompted to set the flight route to return by the end time of the time zone in which flight of the unmanned aerial vehicle is permitted, and the unmanned aerial vehicle can be prevented from flying after the end time.

Embodiments of the present disclosure will be described with reference to the attached diagrams. Note that the following embodiments are specific examples of the present disclosure, and do not restrict the technical scope of the present disclosure.

First Embodiment

FIG. 1 is a diagram illustrating the configuration of a flight control system according to a first embodiment of the present disclosure. The flight control system illustrated in FIG. 1 includes a communication terminal 10, a flight route generating server 20, an external server 30, and an unmanned aerial vehicle 40.

The communication terminal 10 is used by a user 1, and accepts input of a departure point of the unmanned aerial vehicle 40 and waypoints that the unmanned aerial vehicle 40 passes. The communication terminal 10 can generate a flight route by downloading a flight route generating program. The communication terminal 10 is communicably connected to the flight route generating server 20 and external server 30 via network 50. Examples of the communication terminal 10 include a smartphone, a tablet computer, a desktop personal computer, and a shared personal computer. The communication terminal 10 may be a controller that remotely controls the unmanned aerial vehicle 40.

The flight route generating server 20 generates a flight route for autonomous flight of the unmanned aerial vehicle 40. The flight route generating server 20 is communicably connected to the communication terminal 10, external server 30, and unmanned aerial vehicle 40 via the network 50.

The external server 30 provides the sundown time information and map information to the flight route generating server 20. Note that the server that provides the sundown time information and the server that provides the map information may be the same server or may be different servers.

The unmanned aerial vehicle 40 performs autonomous flight based on the flight route generated by the flight route generating server 20. The unmanned aerial vehicle 40 has multiple propellers, and moves in the forward, backward left, right, up, and down directions, by controlling the rotations of each of the multiple propellers. The unmanned aerial vehicle 40 performs autonomous flight along the flight route generated by the flight route generating server 20 while acquiring the current position by Global Positioning System (GPS).

Figure 2:
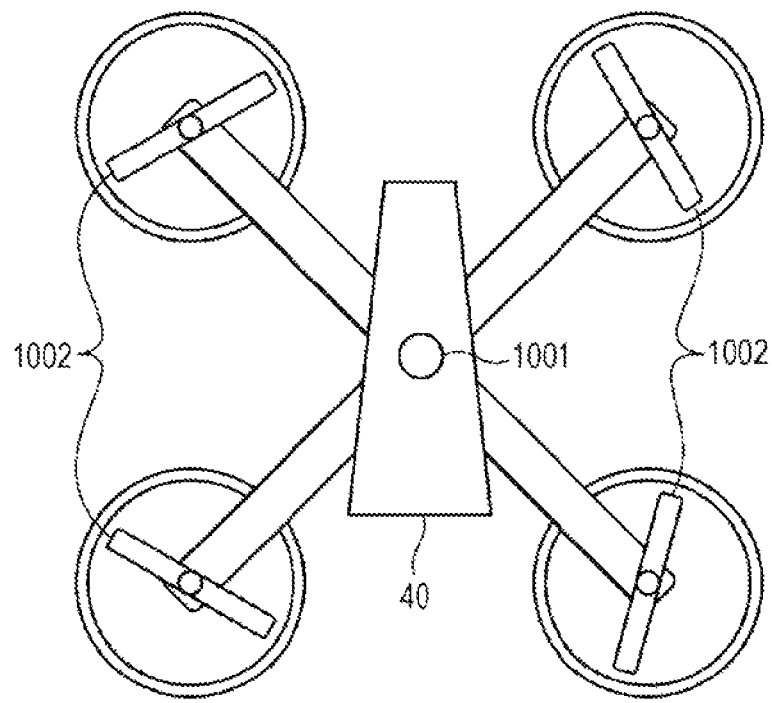
FIG. 2 is an overall view illustrating an example of an unmanned aerial vehicle according to the first embodiment of the present disclosure.
Figure 3:
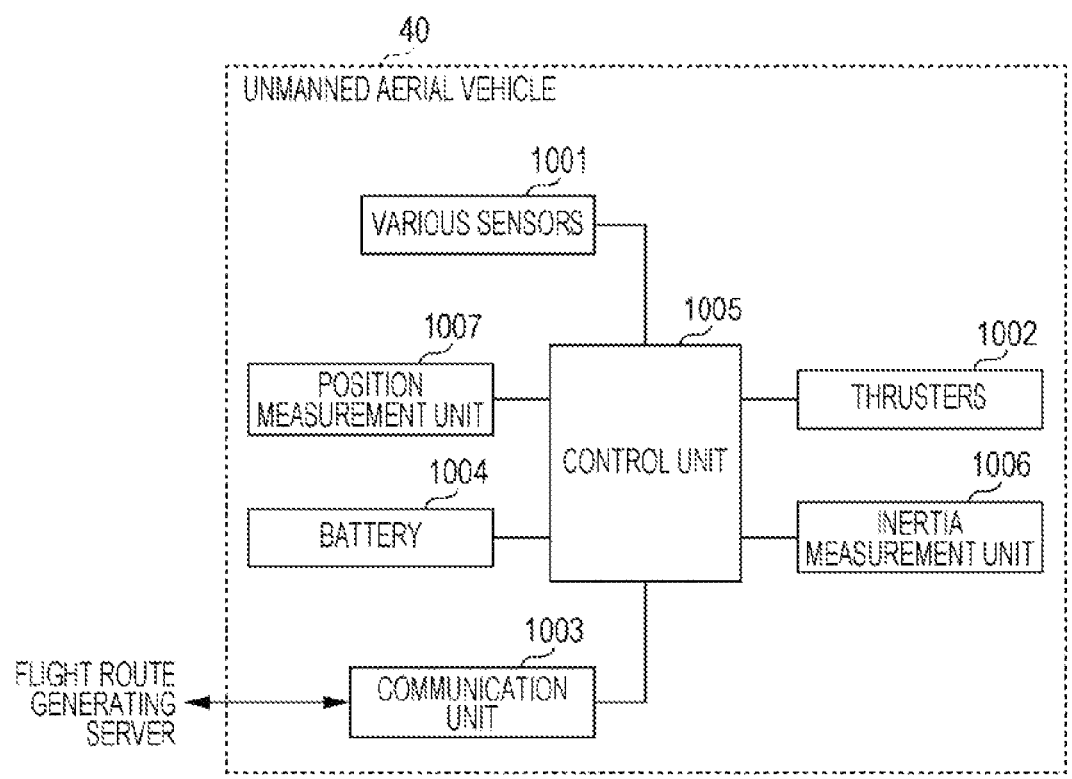
FIG. 3 is a block diagram illustrating the configuration of the unmanned aerial vehicle according to the first embodiment of the present disclosure.

FIG. 2 is an overall view illustrating an example of an unmanned aerial vehicle according to the first embodiment of the present disclosure. FIG. 3 is a block diagram illustrating the configuration of the unmanned aerial vehicle according to the first embodiment of the present disclosure.

The unmanned aerial vehicle 40 has at least various sensors 1001 and thrusters 1002, as illustrated in FIG. 2. Stored within the unmanned aerial vehicle 40 are a communication unit 1003, a battery 1004, a control unit 1005, an inertia measurement unit 1006, and a position measurement unit 1007.

The various sensors 1001 are image sensors, human sensors, and so forth, for example. These various sensors 1001 are installed in accordance with the purpose of usage of the unmanned aerial vehicle 40.

The thrusters 1002 are made up of propellers and motors that rotate the propellers, to yield lift, thrust, and torque for flying the unmanned aerial vehicle 40. Although the example in FIG. 2 shows the unmanned aerial vehicle 40 having four thrusters 1002, the number of thrusters 1002 may be five or more, for example.

The unmanned aerial vehicle 40 includes at least the various sensors 1001, thrusters 1002, communication unit 1003, battery 1004, control unit 1005, inertia measurement unit 1006, and position measurement unit 1007, as illustrated in FIG. 3. The various sensors 1001 and thrusters 1002 have already been described with reference to the overall view in FIG. 2, so description thereof will be omitted here.

The communication unit 1003 includes electronic circuits for performing wireless communication with other unmanned aerial vehicles and external communication terminals. The communication unit 1003 receives wireless communication of commands or the like relating to flight control and so forth, from other unmanned aerial vehicles, external terminals, and so forth, and transmits wireless signals to other unmanned aerial vehicles, external terminals, and so forth. The battery 1004 supplies power source voltage to the elements of the unmanned aerial vehicle 40. The control unit 1005 controls travel of the unmanned aerial vehicle 40, and is made up of even more components. For example, an information processing device including a processor and memory storing programs may operate as the control unit 1005.

The inertia measurement unit 1006 has a gyro sensor or an acceleration sensor, and measures the acceleration or angular velocity of the unmanned aerial vehicle 40. Flight of the unmanned aerial vehicle 40 is controlled based on output from the inertia measurement unit 1006. The position measurement unit 1007 measures the current position of the unmanned aerial vehicle 40. The position measurement unit 1007 uses a GPS sensor here. The unmanned aerial vehicle 40 configured in this way performs autonomous flight control.

Figure 4:
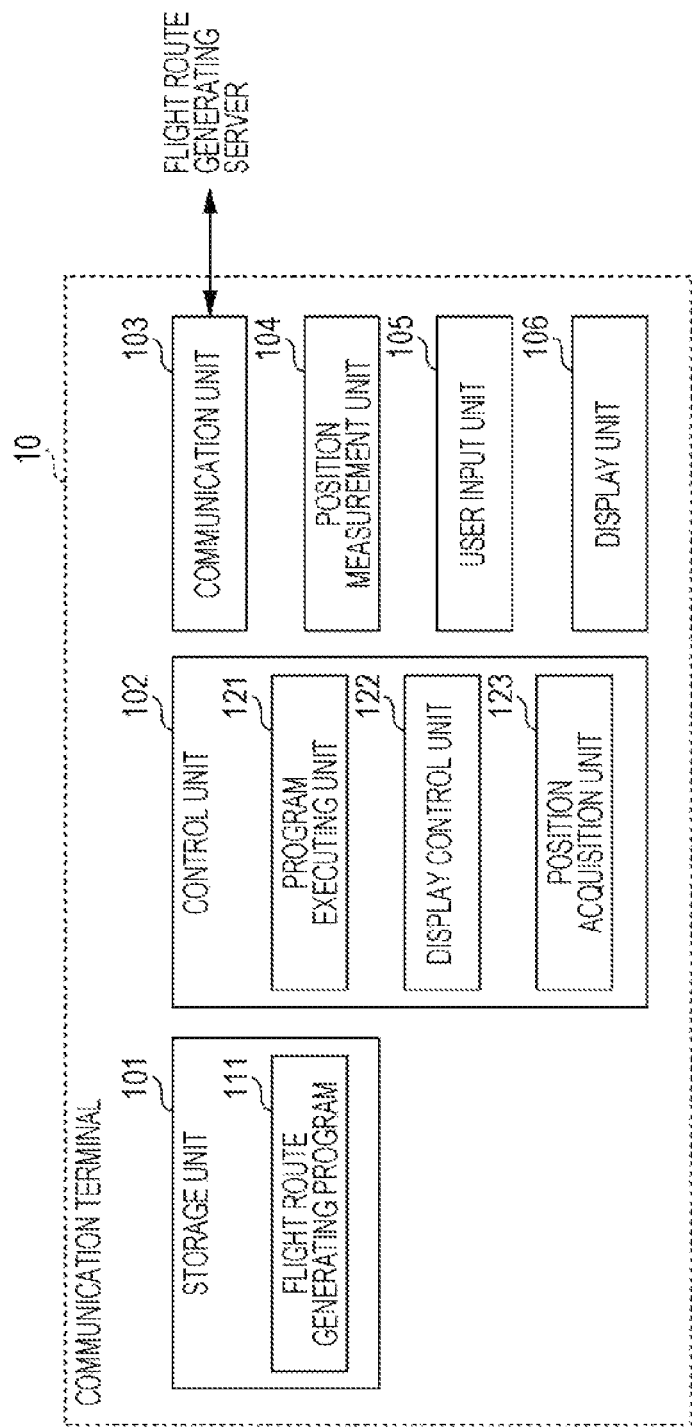
FIG. 4 is a block diagram illustrating the configuration of a communication terminal according to the first embodiment of the present disclosure.

FIG. 4 is a block diagram illustrating the configuration of the communication terminal 10 according to the first embodiment of the present disclosure. The communication terminal 10 illustrated in FIG. 4 includes a storage unit 101, a control unit 102, a communication unit 103, a position measurement unit 104, a user input unit 105, and a display unit 106.

The storage unit 101 is semiconductor memory, for example, and stores various types of information. The storage unit 101 stores a flight route generating program 111. The flight route generating program 111 is a program for generating flight routes for the unmanned aerial vehicle 40. The communication unit 103 transmits various types of information to the flight route generating server 20 and receives various types of information from the flight route generating server 20, by a communication standard such as Long-Term Evolution (LTE) or the like, for example. The position measurement unit 104 is a GPS device, for example, and measures the current position of the communication terminal 10.

The user input unit 105 is a touchscreen or operating buttons, for example, and accepts user input. The user input unit 105 accepts input of a departure point of the unmanned aerial vehicle 40, a first waypoint that the unmanned aerial vehicle 40 passes, and a second waypoint that the unmanned aerial vehicle 40 passes next after the first waypoint. The user input unit 105 further accepts input of a departure time of departing the departure point.

The display unit 106 displays various types of information. The display unit 106 displays a first waypoint that the unmanned aerial vehicle 40 is capable of reaching by the end time of a time zone in which the unmanned aerial vehicle 40 is permitted to fly, and a second waypoint that the unmanned aerial vehicle 40 is incapable of reaching by the end time of a time zone in which the unmanned aerial vehicle 40 is permitted to fly, using different modes. The display unit 106 displays an end time arrival point (a later-described the sundown time arrival point) that the unmanned aerial vehicle 40 will reach at the end time. The display unit 106 displays a first planned arrival time at which the unmanned aerial vehicle 40 will reach the first waypoint, and a second planned arrival time at which the unmanned aerial vehicle 40 will reach the second waypoint.

Note that in the present embodiment, the time zone regarding which the unmanned aerial vehicle 40 is permitted to fly is the daytime, from sunup time to sundown time, for example. The end time is the sundown time at a destination point which the unmanned aerial vehicle 40 finally reaches, the sundown time at a point where the communication terminal 10 is, or the sundown time at the departure point from which the unmanned aerial vehicle 40 departs, for example.

The control unit 102 is, for example, a central processing unit (CPU), and controls operations of the communication terminal 10. The control unit 102 includes a program executing unit 121, a display control unit 122, and a position acquisition unit 123.

The program executing unit 121 executes the flight route generating program 111 stored in the storage unit 101. The display control unit 122 controls the display unit 106. The position acquisition unit 123 acquires the current position of the communication terminal 10 that has been measured by the position measurement unit 104.

Figure 5:
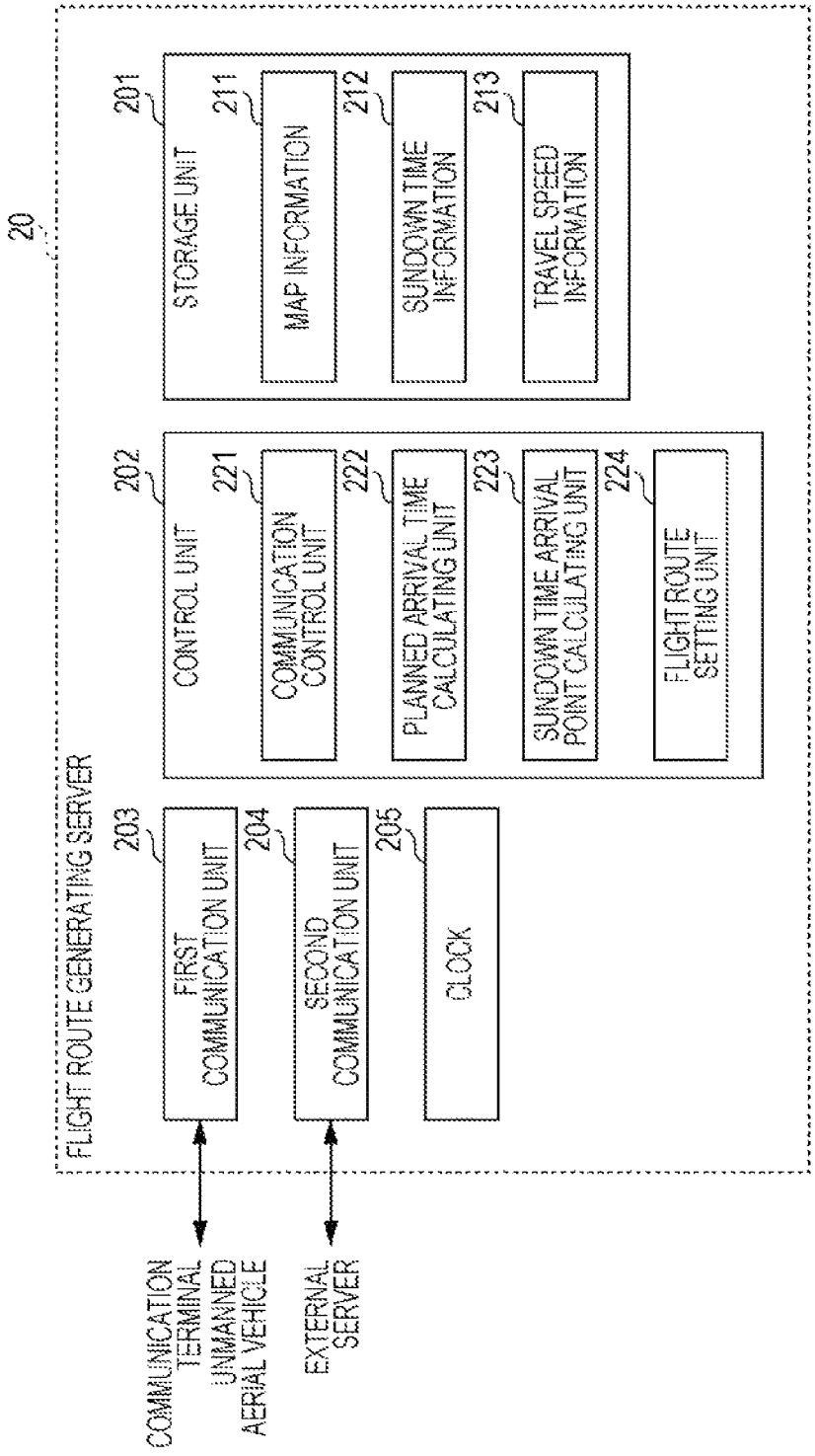
FIG. 5 is a block diagram illustrating the configuration of a flight route generating server according to the first embodiment of the present disclosure.

FIG. 5 is a block diagram illustrating the configuration of the flight route generating server 20 according to the first embodiment of the present disclosure. The flight route generating server 20 illustrated in FIG. 5 includes a storage unit 201, a control unit 202, a first communication unit 203, a second communication unit 204, and a clock 205.

The storage unit 201 is, for example, semiconductor memory or a hard disk drive, and stores various types of information. The storage unit 201 stores map information 211, the sundown time information 212, and traveling speed information 213. The map information 211 represents a map. The sundown time information 212 represents the sundown time. The traveling speed information 213 represents the traveling speed of the unmanned aerial vehicle 40. Note that the traveling speed is a speed set beforehand to the unmanned aerial vehicle 40 that performs autonomous flight.

The control unit 202 is a CPU, for example, and controls operations of the flight route generating server 20. The control unit 202 includes a communication control unit 221, a planned arrival time calculating unit 222, a sundown time arrival point calculating unit 223, and a flight route setting unit 224.

The communication control unit 221 controls the first communication unit 203 and the second communication unit 204. The communication control unit 221 acquires information indicating the position of the departure point transmitted by the communication terminal 10, information indicating positions of waypoints, and the departure time.

The planned arrival time calculating unit 222 calculates the distance from the departure point to the first waypoint. The planned arrival time calculating unit 222 acquires the travel speed of the unmanned aerial vehicle 40 from the storage unit 201. The planned arrival time calculating unit 222 calculates eth travel time from the departure point to the first waypoint, based on the travel distance and travel speed. The planned arrival time calculating unit 222 calculates the first planned arrival time when the unmanned aerial vehicle 40 will reach the first waypoint, based on the departure point and travel time. The communication control unit 221 transmits the planned arrival time calculated by the planned arrival time calculating unit 222 to the communication terminal 10 via the first communication unit 203.

The planned arrival time calculating unit 222 also calculates the travel distance from the first waypoint, regarding which the planned arrival time has already been calculated as the first planned arrival time, to the second waypoint that has been input next after the first waypoint. The planned arrival time calculating unit 222 acquires the travel speed of the unmanned aerial vehicle 40 from the storage unit 201. The planned arrival time calculating unit 222 calculates the travel time from the first waypoint to the second waypoint, based on the travel distance and travel speed. The planned arrival time calculating unit 222 calculates the second planned arrival time at which the unmanned aerial vehicle 40 will arrive at the second waypoint, based on the first planned arrival time and the travel time. The communication control unit 221 transmits the second planned arrival time calculated by the planned arrival time calculating unit 222 to the communication terminal 10 via the first communication unit 203.

The sundown time arrival point calculating unit 223 calculates a sundown time arrival point which the unmanned aerial vehicle 40 will reach at the sundown time. In a case where the planned arrival time for an input waypoint is past the sundown time, the sundown time arrival point calculating unit 223 calculates the travel time from the planned arrival time to the sundown time. The sundown time arrival point calculating unit 223 then multiples the calculated travel time by the travel speed, thereby calculating the travel distance from the sundown time to the waypoint. The sundown time arrival point calculating unit 223 calculates a point that is distanced from the waypoint by the calculated travel distance on the flight route, as the sundown time arrival point. The communication control unit 221 transmits information indicating the position of the sundown time arrival point calculated by the sundown time arrival point calculating unit 223 to the communication terminal 10 via the first communication unit 203.

The flight route setting unit 224 sets the generated flight route to the unmanned aerial vehicle 40. The flight route setting unit 224 transmits the generated flight route to the unmanned aerial vehicle 40 via the first communication unit 203.

The first communication unit 203 transmits various types of information to the communication terminal 10 and receives various types of information from the communication terminal 10, by a communication standard such as LTE or the like, for example. The first communication unit 203 also transmits various types of information to the unmanned aerial vehicle 40.

The second communication unit 204 receives various types of information from the external server 30, via the Internet, for example. The second communication unit 204 receives the map information 211 and the sundown time information 212 from the external server 30. Note that while the map information 211 and the sundown time information 212 are received from the external server 30, the present disclosure is not restricted to this in particular, and the first communication unit 203 may receive the map information 211 and the sundown time information 212 input by the user from the communication terminal 10.

The first communication unit 203 may receive traveling speed information 213 input by the user from the communication terminal 10, or may receive traveling speed information 213 transmitted from the unmanned aerial vehicle 40. The second communication unit 204 may also receive traveling speed Information 213 transmitted by the external server 30, and store in the storage unit 201. The clock 205 measures time, and acquires the current time.

Figure 6:
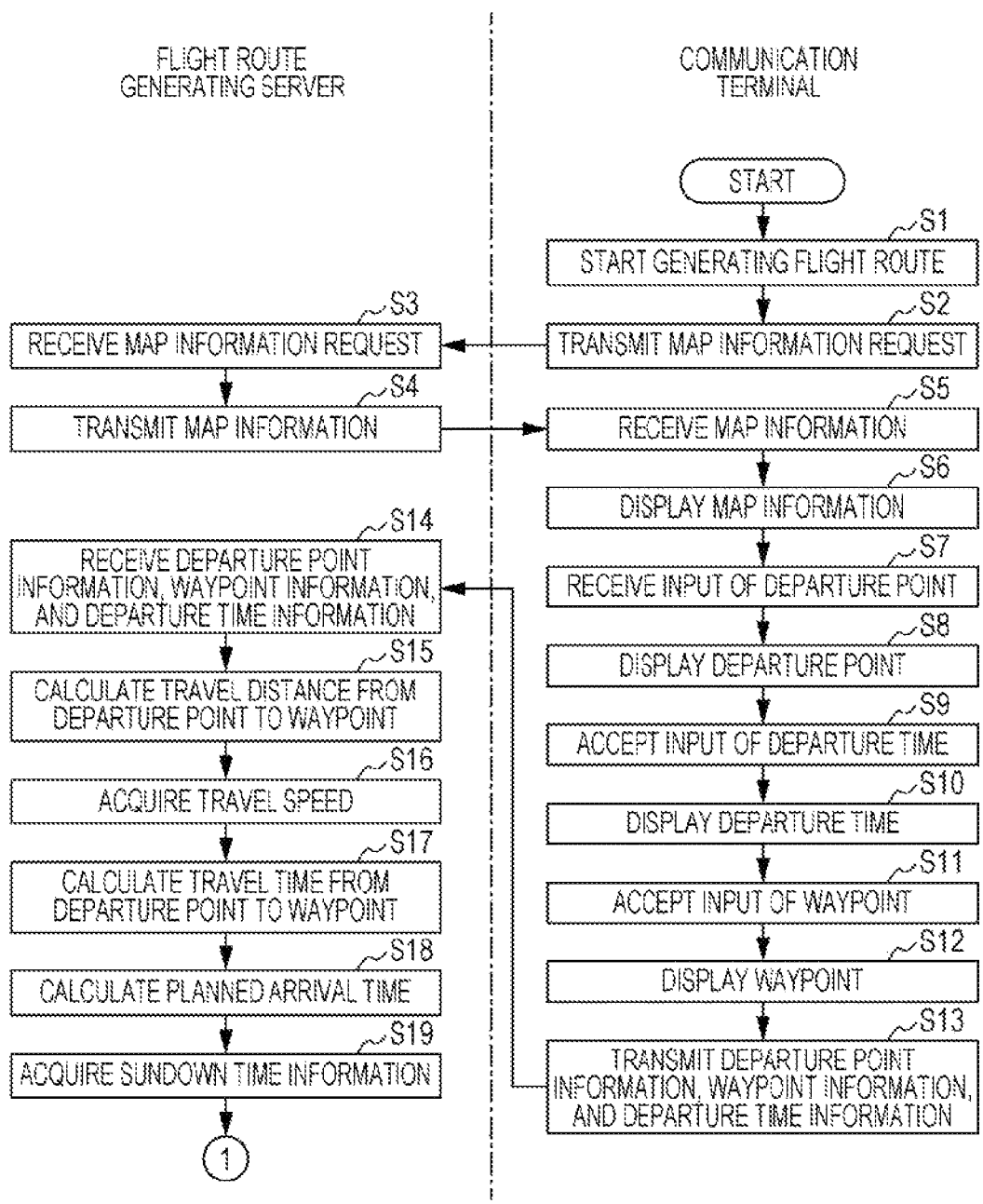
FIG. 6 is a first flowchart for describing flight route generating processing of the communication terminal and flight route generating server according to the first embodiment of the present disclosure.
Figure 7:
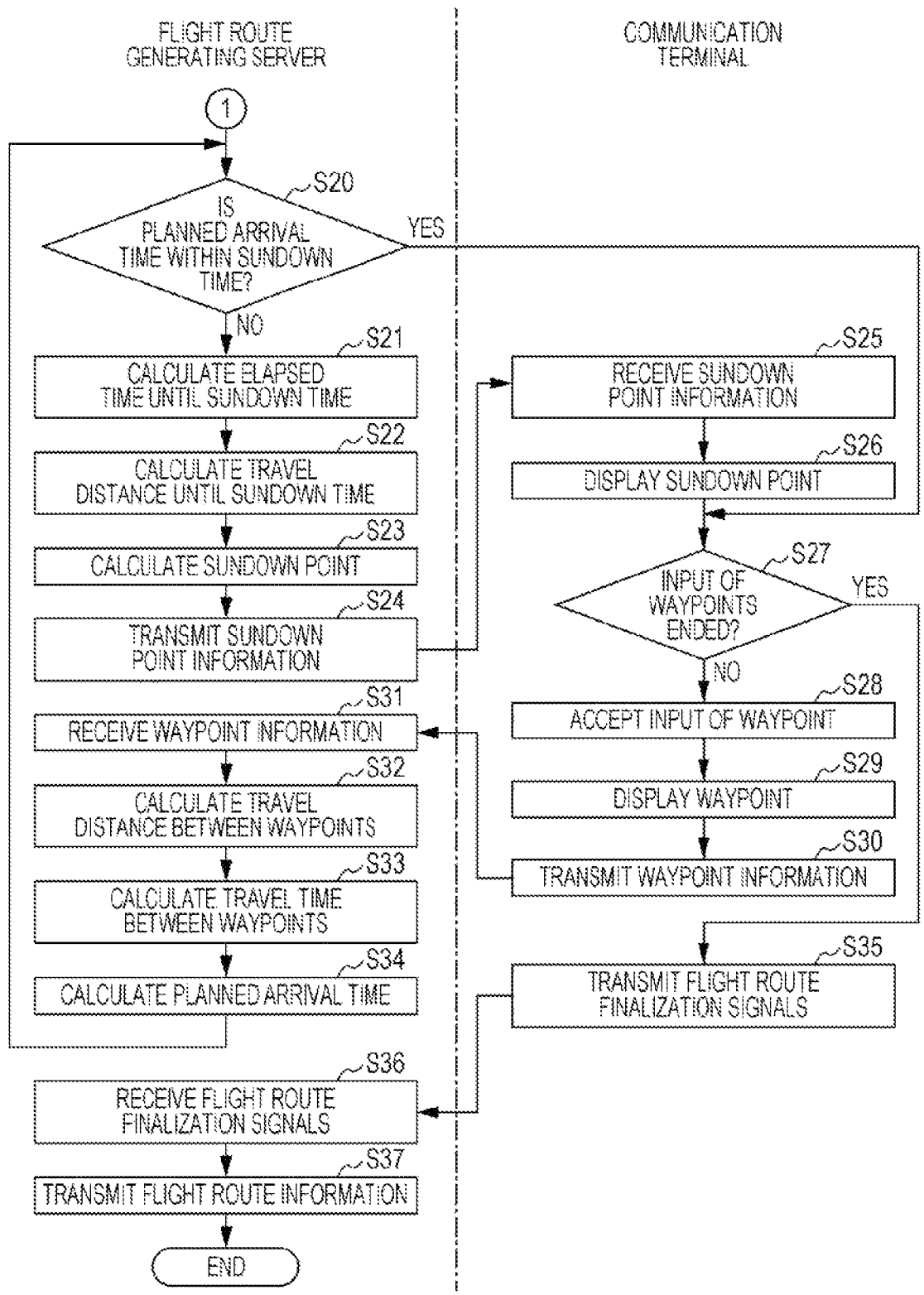
FIG. 7 is a second flowchart for describing flight route generating processing of the communication terminal and flight route generating server according to the first embodiment of the present disclosure.

Next, flight route generating processing by the communication terminal 10 and flight route generating server 20 according to the first embodiment will be described. FIG. 6 is a first flowchart for describing flight route generating processing of the communication terminal and flight route generating server according to the first embodiment of the present disclosure, and FIG. 7 is a second flowchart for describing flight route generating processing of the communication terminal and flight route generating server according to the first embodiment of the present disclosure.

First in step S1, the program executing unit 121 of the communication terminal 10 executes the flight route generating program 111 based on instruction from the user input unit 105, and starts generating a flight route. The user presses a button that is provided to the user input unit 105 to start generating of the flight route. The user input unit 105 instructs the program executing unit 121 to generate a flight route.

Next, in step S2, the display control unit 122 transmits a map information request via the communication unit 103, to request map information. Note that the map information request includes position information of the communication terminal 10 that has been acquired by the position acquisition unit 123.

Next, in step S3, the communication control unit 221 of the flight route generating server 20 receives the map information request transmitted by the communication terminal 10, via the first communication unit 203.

In step S4, the communication control unit 221 reads, from the storage unit 201, map information corresponding to the position information of the communication terminal 10 included in the map information request, and transmits the map information that has been read out to the communication terminal 10 via the first communication unit 203. The position information of the communication terminal 10 is expressed in terms of latitude and longitude. The communication control unit 221 reads out map information of a certain range centered on the position of the communication terminal 10, from the storage unit 201.

The display control unit 122 of the communication terminal 10 then receives the map information transmitted from the flight route generating server 20 via the communication unit 103 in step S5.

The display control unit 122 displays the received map information on the display unit 106 in step S6. Note that while the communication terminal 10 transmits the map information request including the position information of the communication terminal 10 to the flight route generating server 20, and receives map information of a certain range centered on the position of the communication terminal 10 from the flight route generating server 20 in the present first embodiment, the present disclosure is not restricted in particular to this. The communication terminal 10 may receive position information of the unmanned aerial vehicle 40 from the unmanned aerial vehicle 40, transmit a map information request including the position information of the unmanned aerial vehicle 40 that has been received to the flight route generating server 20, and receive map information of a certain range centered on the position of the unmanned aerial vehicle 40 from the flight route generating server 20. This is similarly applicable to other embodiments as well.

Next, in step S7, the user input unit 105 accepts input of the departure point by the user. Note that the departure point may be a certain point on a map, or may be the current position of the communication terminal 10. The user inputs the departure point using the user input unit 105. In a case where the user input unit 105 is a touchscreen, for example, input of the departure point is accepted by the user touching a position thereupon, corresponding to the departure point on the map displayed on the display unit 106. The user input unit 105 may also accept information capable of identifying the position on the map, such as the address of the departure point or the like.

Next, in step S8, the display control unit 122 displays an icon, representing the departure point input by the user, on the display unit 106. The icon representing the departure point is not restricted in particular, and is expressed by various shapes, such as a circle, a filled-in circle, etc., for example.

Next, in S9, the user input unit 105 accepts input of departure time. The departure time may be the current time, or may be a point-in-time in the future.

In step S10, the display control unit 122 displays the departure time Input by the user on the display unit 106. The position at which the departure time is displayed is not restricted in particular, and is displayed near the icon representing the departure point, for example.

The user input unit 105 then accepts input of a waypoint from the user in step S11. The user inputs a waypoint using the user input unit 105. A waypoint is a point that the autonomously flying unmanned aerial vehicle 40 passes. For example, in a case where the user input unit 105 is a touchscreen, for example, input of a waypoint is accepted by the user touching a position thereupon, corresponding to the waypoint on the map displayed on the display unit 106. The user input unit 105 may also accept input of information capable of identifying the position on the map, such as the address of the waypoint or the like.

Next, in step S12, the display control unit 122 displays an icon, representing the waypoint input by the user, on the display unit 106. The icon representing the waypoint is not restricted in particular, and is expressed by various shapes, such as a circle, a filled-in circle, etc., for example. The icon representing the waypoint preferably is different from the icon representing the departure point. The display control unit 122 may connect the icon representing the departure point and the icon representing the waypoint using a straight line or arrow, thereby explicitly indicating the flight route of the unmanned aerial vehicle 40.

In step S13, the communication unit 103 transmits departure point information, waypoint information, and departure time information, to the flight route generating server 20. Departure point information is information indicating the latitude and longitude of the departure point, for example, and it is sufficient as long as the departure point information is information whereby a position can be identified on the map. Waypoint information is information indicating the latitude and longitude of the departure point, and it is sufficient as long as the waypoint information is Information whereby the position can be identified on the map. Departure time information is information indicating the departure time specified by the user.

Then in step S14, the communication control unit 221 of the flight route generating server 20 receives the departure point information, waypoint information, and departure time information transmitted from the communication terminal 10, via the first communication unit 203. Note that the received departure point information, waypoint information, and departure time information, are stored in the storage unit 201.

The planned arrival time calculating unit 222 then calculates the travel distance from the departure point to the waypoint in step S15, based on the departure point information and waypoint information that have been received.

In step S16, the planned arrival time calculating unit 222 acquires travel speed information representing the travel speed of the unmanned aerial vehicle 40, from the storage unit 201.

Next, in step S17, the planned arrival time calculating unit 222 calculates the travel time from the departure point to the waypoint, based on the travel distance from the departure point to the waypoint, and the travel speed. That is to say, the planned arrival time calculating unit 222 divides the travel distance from the departure point to the waypoint by the travel speed, thereby calculating the travel time.

In step S18, the planned arrival time calculating unit 222 calculates the planned arrival time at which the unmanned aerial vehicle 40 will arrive at the waypoint, based on the travel time from the departure point to the waypoint, and the departure time information. That is to say, the planned arrival time calculating unit 222 calculates a point in time, where the travel time has elapsed from the departure time, as the planned arrival time. The communication control unit 221 may transmit planned arrival time information indicating the calculated planned arrival time to the communication terminal 10 via the first communication unit 203. The communication unit 103 of the communication terminal 10 may receive the planned arrival time information, and the display control unit 122 may display the planned arrival time indicated by the received planned arrival time information near the icon indicating the waypoint.

The sundown time arrival point calculating unit 223 acquires the sundown time information indicating the sundown time from the storage unit 201 in the following step S19. The sundown time is the sundown time at the destination point, for example.

Next, in step S20, the sundown time arrival point calculating unit 223 determines whether or not the planned arrival time is the sundown time or earlier. In a case where determination is made that the planned arrival time is the sundown time or earlier (YES in step S20), the flow advances to the processing in step S27. On the other hand, in a case where determination is made that the planned arrival time is not the sundown time or earlier, i.e., that the planned arrival time is later than the sundown time (NO in step S20), the sundown time arrival point calculating unit 223 calculates the elapsed time from the departure time to the sundown time in step S21.

In the following step S22, the sundown time arrival point calculating unit 223 then calculates the travel distance over which the unmanned aerial vehicle 40 will travel from the departure time until the sundown time, by multiplying the elapsed time from the departure time until the sundown time by the travel speed.

In step S23, the sundown time arrival point calculating unit 223 calculates a position on a straight line connecting the departure point and the waypoint where the travel distance has been covered from the departure point, as the sundown point.

Next, the communication control unit 221 transmits sundown point information indicating the position of the sundown point to the communication terminal 10 via the first communication unit 203 in step S24. An example of sundown point information is information indicating the latitude and longitude of the sundown point, and it is sufficient as long as the sundown point information is information whereby the position can be identified on the map. The communication control unit 221 may also transmit the sundown time information indicating the sundown time to the communication terminal 10, in addition to the sundown point information.

Next, in step S25, the communication unit 103 of the communication terminal 10 receives the sundown point information transmitted by the flight route generating server 20.

Then in step S26, the display control unit 122 displays an icon indicating the sundown point on the display unit 106.

Note that the icon indicating the sundown point is not restricted in particular, and is expressed by various shapes, such as an X or the like. The icon indicating the sundown point preferably is different from the icons indicating the departure point and the waypoint. In a case where the sundown time information is received, the display control unit 122 may display the sundown time near the icon indicating the sundown point.

Next, in step S27, the display control unit 122 determines whether or not input of waypoints has ended. For example, the user input unit 105 includes an end button for ending input of waypoints, i.e., for finalizing the flight route. In a case that the end button has been pressed, the display control unit 122 determines that input of waypoints has been ended. In a case where determination is made that input of waypoints has not been ended (NO in step S27), the user input unit 105 accepts input of a waypoint from the user in step S28. The waypoint input method is as described above.

In step S29, the display control unit 122 then displays an icon indicating the waypoint input by the user on the display unit 106. The display method for the icon indicating the waypoint is as described above.

Next, in step S30, the communication unit 103 transmits waypoint information to the flight route generating server 20.

In step S31, the communication control unit 221 receives the waypoint information transmitted from the communication terminal 10 via the first communication unit 203. The received waypoint information is stored in the storage unit 201.

In step S32, the planned arrival time calculating unit 222 calculates the travel distance from the waypoint Input this time to the waypoint input the previous time, based on the received waypoint information from this time and the waypoint information from the previous time. The waypoint information from the previous time is stored in the storage unit 201, so the planned arrival time calculating unit 222 reads out the waypoint information from the previous time from the storage unit 201.

The planned arrival time calculating unit 222 in step S33 calculates the travel time from the waypoint input the previous time to the waypoint input this time, based on the travel distance from the waypoint input the previous time to the waypoint input this time, and the travel speed. That is to say, the planned arrival time calculating unit 222 calculates the travel time by dividing the travel distance from the waypoint input the previous time to the waypoint input this time by the travel speed.

The planned arrival time calculating unit 222 then in step S34 calculates the planned arrival time at which the unmanned aerial vehicle 40 will arrive at the waypoint input this time, based on the travel time from the waypoint input the previous time to the waypoint input this time, and the planned arrival time for the waypoint input the previous time. That is to say, the planned arrival time calculating unit 222 calculates a point in time, where the travel time has elapsed from the planned arrival time for the waypoint input the previous time, as the planned arrival time for the waypoint input this time, and the flow returns to the processing in step S20. Now, the communication control unit 221 may transmit planned arrival time information indicating the calculated planned arrival time to the communication terminal 10 via the first communication unit 203. The communication unit 103 of the communication terminal 10 may receive the planned arrival time information, and the display control unit 122 may display the planned arrival time indicated by the received planned arrival time information near the icon indicating the waypoint.

In step S20, the sundown time arrival point calculating unit 223 determines whether or not the planned arrival time for the waypoint input this time is the sundown time or earlier. In a case where determination is made that the planned arrival time for the waypoint input this time is the sundown time or earlier (YES in step S20), the flow advances to the processing in step S27. On the other hand, in a case where determination is made that the planned arrival time for the waypoint input this time is not the sundown time or earlier, i.e., that the planned arrival time for the waypoint input this time is later than the sundown time (NO in step S20), in step S21 the sundown time arrival point calculating unit 223 calculates the elapsed time from the waypoint input the previous time to the sundown time.

In step S22, the sundown time arrival point calculating unit 223 then calculates the travel distance over which the unmanned aerial vehicle 40 will travel from the planned arrival time for the waypoint input the previous time until the sundown time, by multiplying the elapsed time from the planned arrival time for the waypoint input the previous time until the sundown time by the travel speed.

In step S23, the sundown time arrival point calculating unit 223 calculates a position on a straight line connecting the waypoint input the previous time and the waypoint input this time, where the travel distance has been covered from the waypoint input the previous time, as the sundown point.

On the other hand, in a case where determination is made that input of waypoints has ended (YES in step S27), in step S35 the communication unit 103 of the communication terminal 10 transmits flight route finalization signals, indicating that the flight route has been finalized, to the flight route generating server 20.

Next, in step S36, the communication control unit 221 of the flight route generating server 20 receives the flight route finalization signals, transmitted from the communication terminal 10, via the first communication unit 203.

Next, in step S37, the flight route setting unit 224 transmits flight route information to the unmanned aerial vehicle 40 via the first communication unit 203, indicating the flight route over which the unmanned aerial vehicle 40 will perform autonomous flight. The flight route information includes the departure point information indicating the position of the departure point, the waypoint information indicating the positions of waypoints, and the departure time information indicating the departure time. The unmanned aerial vehicle 40 receives the flight route information, and when the departure time indicated by the departure time information arrives, starts autonomous flight. The unmanned aerial vehicle 40 then passes the waypoints indicated by the waypoint information, and finally returns to the departure point.

While the unmanned aerial vehicle 40 passes at least one waypoint and returns to the departure point in the present first embodiment, the present disclosure is not restricted to this. The communication terminal 10 may accept input of a final destination that is different from the departure point, and the unmanned aerial vehicle 40 may pass at least one waypoint and land at the final destination. The unmanned aerial vehicle 40 may also take, of multiple waypoints that have been input, the waypoint input last as the final destination. The unmanned aerial vehicle 40 may also take a waypoint that is the only waypoint that has been Input, as the final destination.

In a case where the planned arrival time of an input waypoint is later than the sundown time, the flight route setting unit 224 does not have to accept this input waypoint for the flight route. Alternatively, even if the planned arrival time of an input waypoint is later than the sundown time, the flight route setting unit 224 may accept this input waypoint for the flight route. In this case, the display control unit 122 may notify the user that flight can only be performed until the sundown time, through a notification screen displayed on the display unit 106.

Also, input of the departure time is accepted in the present first embodiment after input of the departure point is accepted but before input of waypoints is accepted, but the present disclosure is not restricted to this in particular, and input of the departure time may be accepted after input of waypoints has been accepted. In this case, input of the departure time is accepted at any timing after generating the flight route. The display of the flight route display screen is then updated based on the input departure time. This is similarly applicable to other embodiments as well.

Although the flight route generating server 20 transmits flight route information to the unmanned aerial vehicle 40 in the present first embodiment, the present disclosure is not restricted to this in particular. The flight route generating server 20 may transmit flight route information to the communication terminal 10, and the communication terminal 10 may transmit the received flight route information to the unmanned aerial vehicle 40. This is similarly applicable to other embodiments as well.

Figure 8:
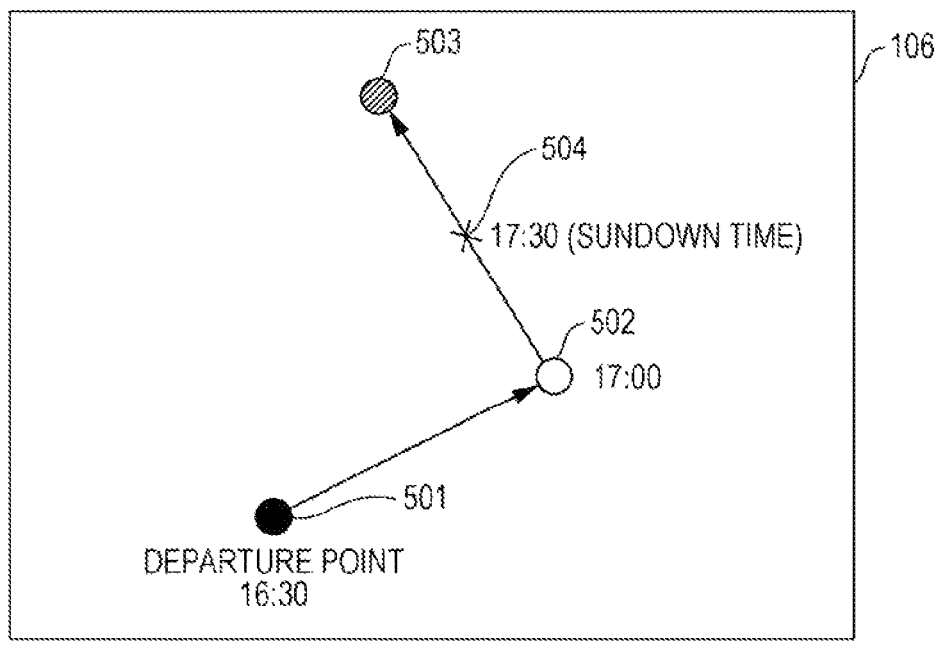
FIG. 8 is a diagram illustrating an example of a display screen displayed on a display unit of the communication terminal according to the first embodiment of the present disclosure.

FIG. 8 is a diagram illustrating an example of a display screen displayed on the display unit of the communication terminal 10 in the present first embodiment. As illustrated in FIG. 8, the display unit 106 displays an icon 501 that indicates the departure point, an icon 502 that indicates the first waypoint that is passed next after the departure point, and an icon 503 that indicates the second waypoint that is passed next after the first waypoint, each input by the user. The departure time ("16:30" in FIG. 8) is displayed near the icon 501.

The planned arrival time at which the unmanned aerial vehicle 40 will reach the first waypoint ("17:00" in FIG. 8) is displayed near the icon 502. In a case where the planned arrival time of arriving at the second waypoint that has been input is later than the sundown time, an icon 504 indicating the sundown point is displayed. The sundown time ("17:30 in FIG. 8) is displayed near the icon 504.

The icon 502 indicating the first waypoint that can be reached by the sundown time, and the icon 503 indicating the second waypoint that cannot be reached by the sundown time, may be displayed in different modes in the present first embodiment. For example, the icon 502 and the icon 503 may be displayed using different colors, or the icon 502 and the icon 503 may be displayed using different shapes. Thus, the point where the sundown time arrives is displayed when setting the flight route, so the user can be prompted to set the flight route to return by the sundown time, and the unmanned aerial vehicle 40 can be prevented from flying after the sundown time.

Figure 9:
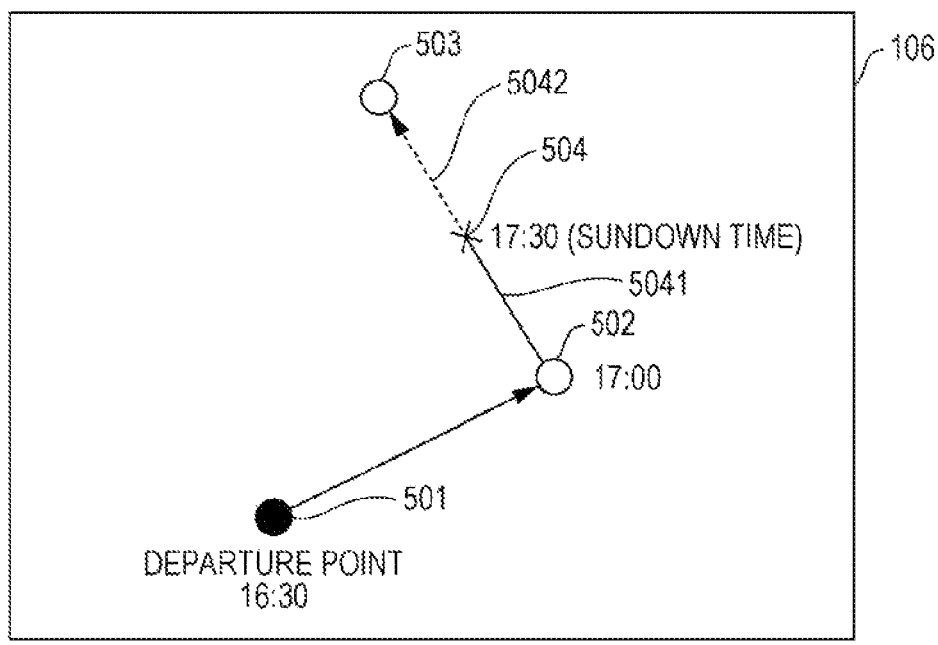
FIG. 9 is a diagram illustrating an example of a display screen displaying a flight route of flying until the sundown time and a flight route of flying past the sundown time in different modes according to the first embodiment of the present disclosure.

Further, on the flight route, the part of the flight route where the unmanned aerial vehicle 40 flies up to the sundown time, and the part of the flight route where the unmanned aerial vehicle 40 flies after the sundown time, may be displayed in different modes. FIG. 9 is a diagram illustrating an example of a display screen displaying a flight route of flying until the sundown time and a flight route of flying past the sundown time in different modes according to the present first embodiment.

In FIG. 9, the icon 501 that indicates the departure point, the icon 502 that indicates the first waypoint that is passed next after the departure point, and the icon 503 that indicates the second waypoint that is passed next after the first waypoint, are each connected by arrows. For example, a flight route 5041 from the icon 501 indicating the departure point to the icon 504 indicating the sundown point is shown in blue, and a flight route 5042 from the icon 504 indicating the sundown point to the icon 503 indicating the second waypoint that cannot be reached by the sundown time is shown in red. Alternatively, the line indicating the flight route 5041 may be displayed using a dark color, and the line indicating the flight route 5042 may be displayed using a light color.

The line indicating the flight route 5041 may also be displayed using a different transparency from the line indicating the flight route 5042. For example, the route up to the sundown time may be displayed using a higher transparency than the route after the sundown time. Further, the line indicating the flight route 5041 may be displayed as a solid line, and the line indicating the flight route 5042 may be displayed as a hollow frame not filled in. Moreover, the line indicating the flight route 5041 may be displayed using a different lien type from the line indicating the flight route 5042. For example, the route till the sundown time may be displayed using a fine line, and the route after the sundown time may be displayed using a heavy line.

Also, mutually different texts may be superimposed over the line indicating the flight route 5041 and the line indicating the flight route 5042. For example, the text "after sundown" or the like may be superimposed on the line indicating the flight route 5042. On the other hand, the text "before sundown" or the like may be superimposed on the line indicating the flight route 5041, for example. Further, text may be superimposed on Just one or the other of the line indicating the flight route 5041 and the line indicating the flight route 5042.

Mutually different marks may be superimposed on the line indicating the flight route 5041 and the line indicating the flight route 5042. For example, a moon-shaped mark may be superimposed on the line indicating the flight route 5042. On the other hand, a sun-shaped mark may be superimposed on the line indicating the flight route 5042. Further, a mark may be superimposed on Just one or the other of the line indicating the flight route 5041 and the line indicating the flight route 5042.

The line indicating the flight route 5042 does not have to be displayed. For example, an arrangement may be made where the flight route up to the sundown time is displayed in one way or another, but the flight route after the sundown time is not displayed.

Figure 10:
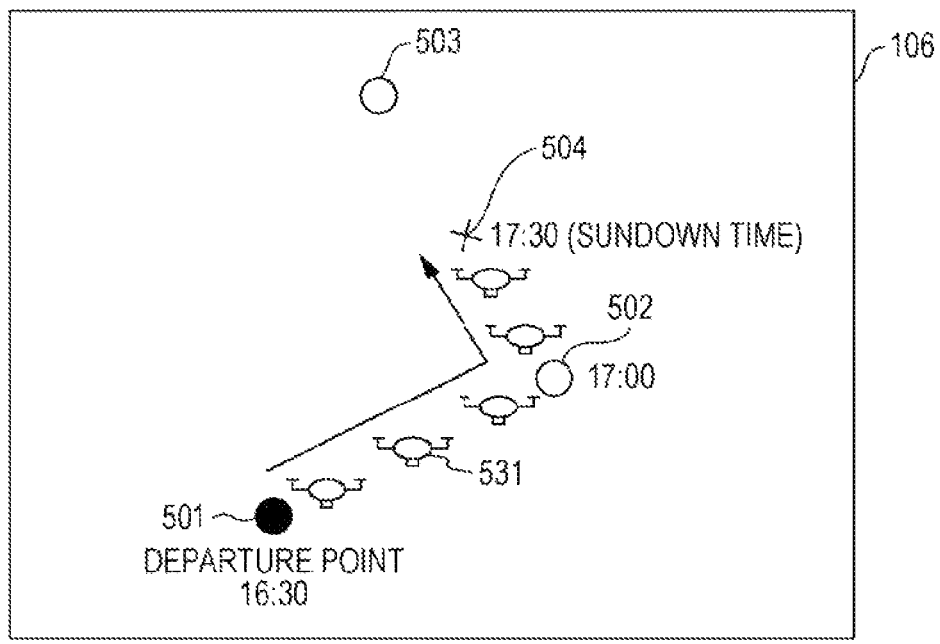
FIG. 10 is a diagram illustrating an example of a display screen that displays an animation of moving an icon over a flight route for flying until the sundown time according to the first embodiment of the present disclosure.

The flight route 5041 may be indicated by an animation of an icon moving over the line indicating the flight route 5041. FIG. 10 is a diagram illustrating an example of a display screen that displays an animation of moving an icon over the flight route until the sundown time, according to the present first embodiment. An animation of an icon 531 shaped like an unmanned aerial vehicle is displayed moving over the flight route from the icon 501 that indicates the departure point to the icon 504 that indicates the sundown point, but no animation is displayed for the flight route beyond the icon 504 indicating the sundown point.

As described above, the flight route until the sundown time and the flight route going past the sundown time are displayed in different modes, so the user can easily distinguish flight routes that can be flown and flight routes that cannot be flown. Accordingly, the user is supported in setting a flight route for flying only during daytime.

Although description has been made in the present first embodiment that the end time of the time zone during which flight of the unmanned aerial vehicle 40 is permitted is the sundown time, the present disclosure is not restricted to this. For example, the end time may be a predetermined time, such as 17:00 or 18:00 or the like.

In the present first embodiment, the unmanned aerial vehicle 40 is not restricted to simply passing over the waypoint, and may land at the waypoint and thereafter depart for the next waypoint. Accordingly, the communication terminal 10 may accept input of the time of departing from the waypoint.

In a case where the unmanned aerial vehicle 40 cannot reach the destination point by the sundown time, the flight route setting unit 224 may change the departure time so that the unmanned aerial vehicle 40 can reach the destination point by the sundown time in the present first embodiment. In this case, the display control unit 122 notifies the user that the departure time will be changed.

In a case where the unmanned aerial vehicle 40 cannot reach the destination point by the sundown time, the flight route setting unit 224 may change the travel speed so that the unmanned aerial vehicle 40 can reach the destination point by the sundown time. In this case, the display control unit 122 notifies the user that the travel speed will be changed.

Figure 11:
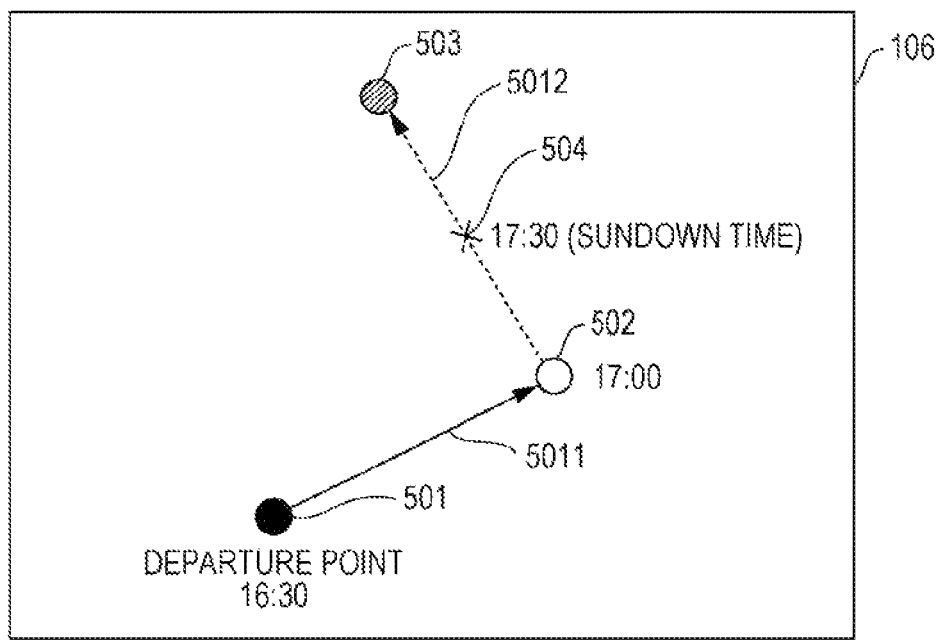
FIG. 11 is a diagram illustrating an example of displaying a flight route up to a waypoint immediately prior to the sundown time and a flight route after the waypoint immediately prior to a sundown point in different modes according to the first embodiment of the present disclosure.

Also, in the present first embodiment, the display control unit 122 may display, of the flight route, the flight route up to a waypoint immediately prior to the end time arrival point, and the flight route after the waypoint immediately prior to the end time arrival point, in different modes. FIG. 11 is a diagram illustrating an example of displaying a flight route up to a waypoint immediately prior to the sundown point and a flight route after the waypoint immediately prior to the sundown point in different modes, according to the present first embodiment.

As illustrated in FIG. 11, the icon 501 that indicates the departure point, the icon 502 that indicates the first waypoint that is passed next after the departure point, and the icon 503 that indicates the second waypoint that is passed next after the first waypoint, are each connected by arrows. For example, a flight route 5011 from the icon 501 that indicates the departure point to the icon 502 that indicates the first waypoint is indicated by a solid line, and a flight route 5012 from the icon 502 that Indicates the first waypoint to the icon 503 that Indicates the second waypoint that cannot be arrived at by the sundown time is displayed by a dashed line. Note that the flight route 5011 and the flight route 5012 may be displayed using different colors from each other. The flight route 5011 and the flight route 5012 may also be displayed in different modes from each other.

In the present first embodiment, the communication terminal 10 may have functions of the flight route generating server 20. That is to say, the communication terminal 10 may further include the second communication unit 204 and dock 205 of the flight route generating server 20. The control unit 102 of the communication terminal 10 may further include the communication control unit 221, planned arrival time calculating unit 222, the sundown time arrival point calculating unit 223, and flight route setting unit 224 of the flight route generating server 20. The storage unit 101 of the communication terminal 10 may further store the map information 211, the sundown time information 212, and traveling speed information 213 of the flight route generating server 20.

Second Embodiment

Figure 12:
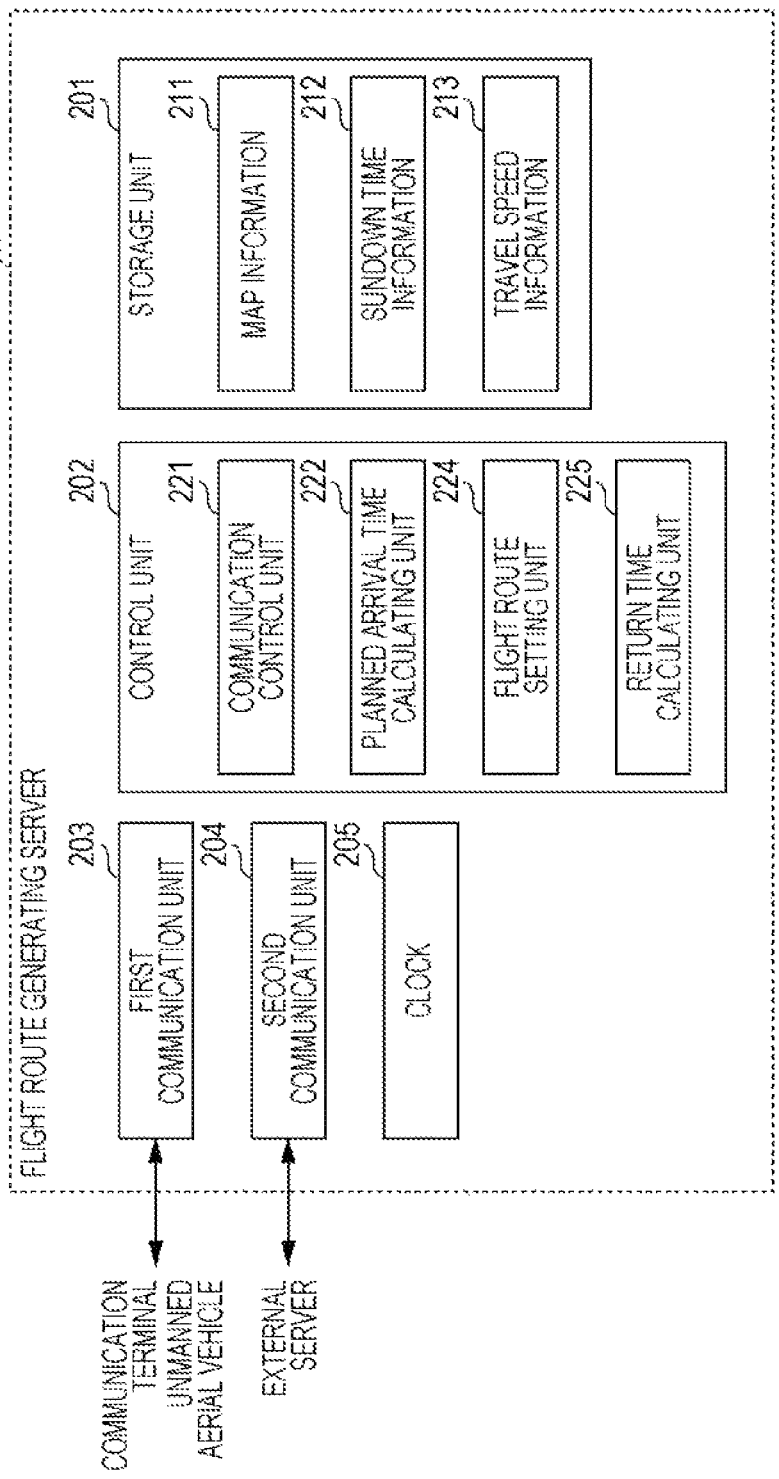
FIG. 12 is a block diagram illustrating the configuration of a flight route generating server according to a second embodiment of the present disclosure.

In a second embodiment, a planned return time of returning from a waypoint input by the user to the departure point is displayed. FIG. 12 is a block diagram illustrating the configuration of a flight route generating server 21 according to the second embodiment of the present disclosure. Note that the configuration of the communication terminal 10 in the present second embodiment is the same as the configuration of the communication terminal 10 in the first embodiment. Components of the flight route generating server 21 in the second embodiment that are the same as the components of the flight route generating server 20 according to the first embodiment illustrated in FIG. 5 are denoted with the same reference numerals, and detailed description will be omitted. The flight route generating server 21 illustrated in FIG. 12 has the storage unit 201, control unit 202, first communication unit 203, second communication unit 204, and clock 205.

The control unit 202 is a CPU for example, and controls operations of the flight route generating server 21. The control unit 202 includes the communication control unit 221, planned arrival time calculating unit 222, flight route setting unit 224, and a time of return calculating unit 225. The time of return calculating unit 225 calculates a first planned time of return of returning from the first waypoint input by the user to the departure point, and a second planned time of return of returning from the second waypoint input by the user to the departure point.

The display unit 106 of the communication terminal 10 displays the first planned arrival time of the unmanned aerial vehicle 40 arriving at the first waypoint, the second planned arrival time of the unmanned aerial vehicle 40 arriving at the second waypoint, the first planned time of return of the unmanned aerial vehicle 40 returning from the first waypoint to the departure point, and the second planned time of return of the unmanned aerial vehicle 40 returning from the second waypoint to the departure point.

Figure 13:
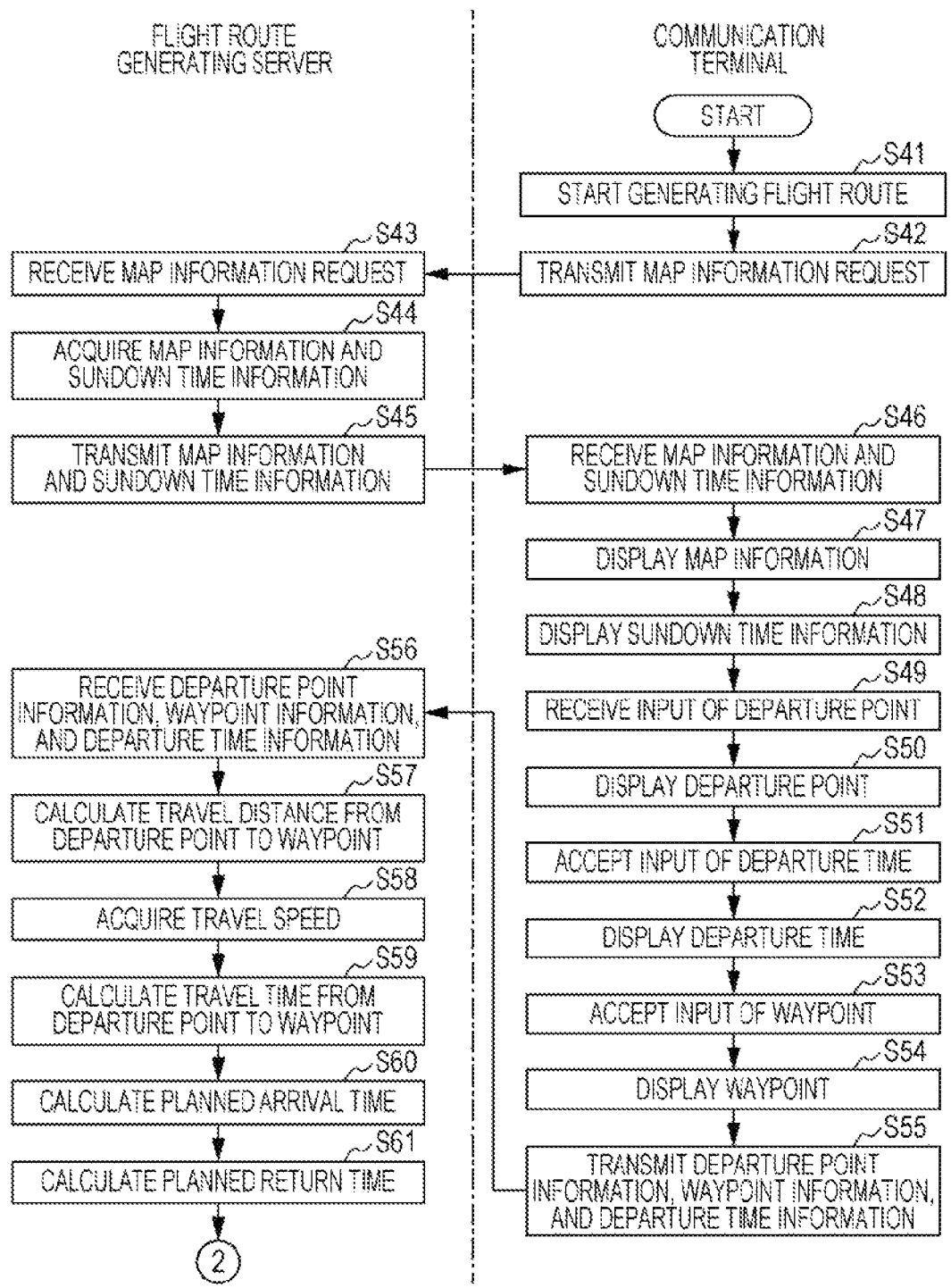
FIG. 13 is a first flowchart for describing flight route generating processing of the communication terminal and flight route generating server according to the second embodiment of the present disclosure.
Figure 14:
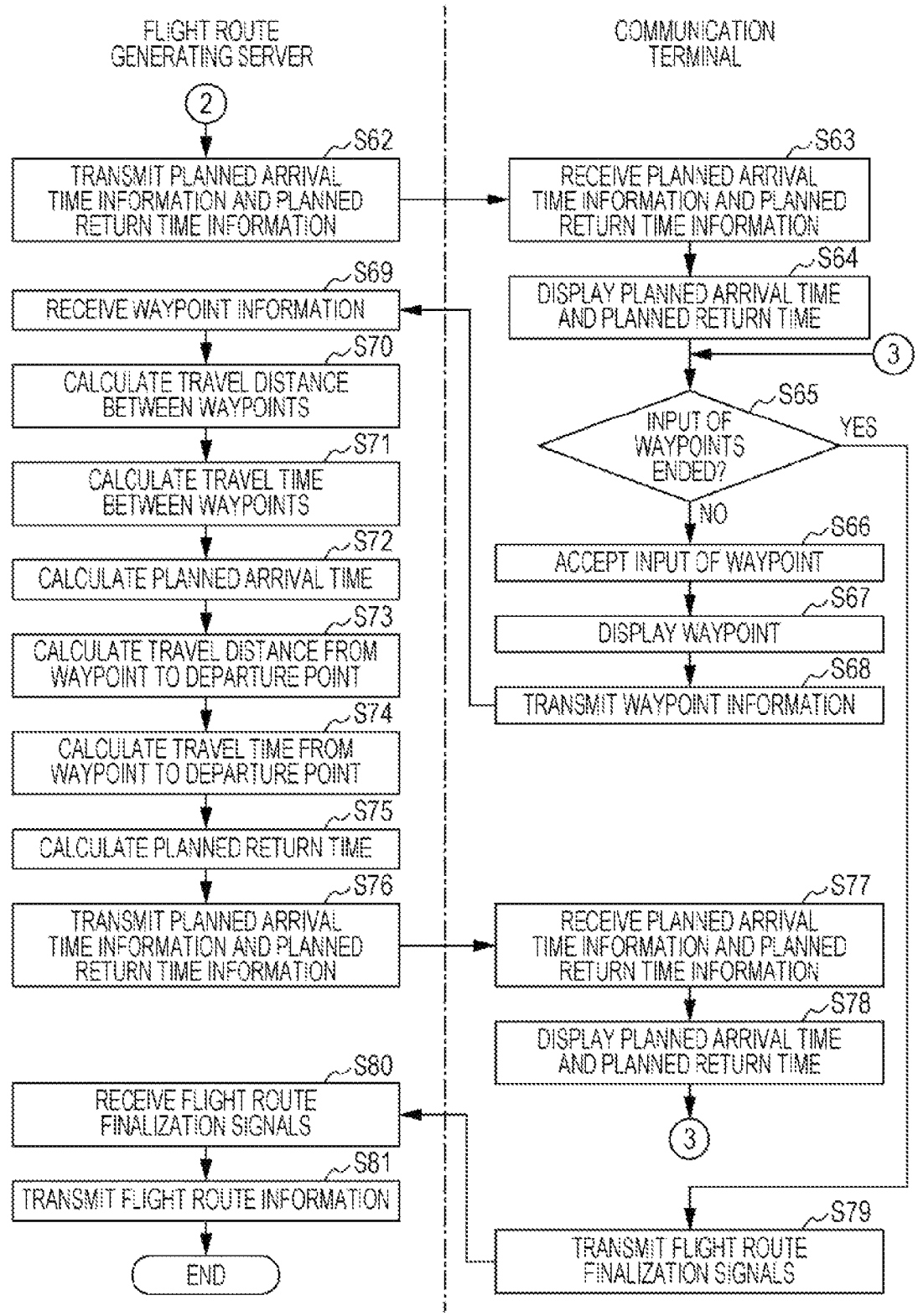
FIG. 14 is a second flowchart for describing flight route generating processing of the communication terminal and flight route generating server according to the second embodiment of the present disclosure.

Next, the flight route generating processing of the communication terminal 10 and flight route generating server 21 according to the present second embodiment will be described. FIG. 13 is a first flowchart for describing flight route generating processing of the communication terminal and flight route generating server according to the second embodiment of the present disclosure, and FIG. 14 is a second flowchart for describing flight route generating processing of the communication terminal and flight route generating server according to the second embodiment of the present disclosure. The processing of steps S41 through S43 in FIG. 13 are the same as the processing of steps S1 through S3 in FIG. 6, so description will be omitted.

Next, in step S44, the communication control unit 221 acquires map information and the sundown time information from the storage unit 201. Note that the sundown time is the sundown time at the position where the communication terminal 10 is situated, for example. The communication control unit 221 reads out, from the storage unit 201, the map information and the sundown time information corresponding to the position information of the communication terminal 10 included in the map information request.

Next, in step S45, the communication control unit 221 transmits the acquired map information and the sundown time information to the communication terminal 10 via the first communication unit 203.

In step S46, the display control unit 122 of the communication terminal 10 receives the map information and the sundown time information transmitted by the flight route generating server 21, via the communication unit 103.

In step S47, the display control unit 122 then displays the received map information on the display unit 106.

In the following step S48, the display control unit 122 displays the sundown time indicated by the received the sundown time information on the display unit 106.

The processing of steps S49 through S60 in FIG. 13 are the same as the processing of steps S7 through S18 in FIG. 6, so description will be omitted.

Next, in step S61, the time of return calculating unit 225 calculates the planned time of return of returning from a waypoint input by the user to the departure point. Specifically, the time of return calculating unit 225 calculates, from the departure time, a time at which double the travel time from the departure point to the waypoint has elapsed, as the planned time of return.

Then in step S62, the communication control unit 221 transmits planned arrival time information indicating the planned arrival time, and planned time of return Information indicating the planned time of return, to the communication terminal 10 via the first communication unit 203.

In step S63, the communication unit 103 of the communication terminal 10 receives the planned arrival time information and planned time of return information transmitted by the flight route generating server 21.

Next, in step S64, the display control unit 122 displays the planned arrival time Indicated by the planned arrival time information, and the planned time of return indicated by the planned time of return information, near the icon indicating the waypoint.

The processing of steps S65 through S72 in FIG. 14 are the same as the processing of steps S27 through SM in FIG. 7, so description will be omitted.

Next, in step S73, the time of return calculating unit 225 calculates the travel distance from the waypoint input this time, to the departure point, based on the waypoint information received this time and the departure point information. Note that the departure point information is stored in the storage unit 201, so the time of return calculating unit 225 reads the departure point information out from the storage unit 201.

The time of return calculating unit 225 then calculates the travel time from the waypoint input this time to the departure point, based on the travel distance from the waypoint input this time to the departure point and the travel speed, in step S74. That is to say, the time of return calculating unit 225 calculates the travel time by dividing the travel distance from the waypoint input this time to the departure point by the travel speed.

Next, in step S75, the time of return calculating unit 225 calculates a point in time, where the travel time from the waypoint input this time to the departure point has elapsed, from the planned arrival time at the waypoint input this time, as the planned time of return.

Next, in step S76, the communication control unit 221 transmits the planned arrival time information indicating the planned arrival time, and the planned time of return information indicating the planned time of return, to the communication terminal 10 via the first communication unit 203.

In step S77, the communication unit 103 of the communication terminal 10 receives the planned arrival time Information and planned time of return information transmitted by the flight route generating server 21.

Next, the display control unit 122 in step S78 displays the planned arrival time indicated by the planned arrival time information, and the planned time of return indicated by the planned time of return information, nearby the Icon representing the waypoint input this time. The flow then returns to the processing in step S65, and the processing of steps S65 through S78 is repeated until input of waypoints ends.

In a case where determination Is made in step S65 that input of waypoints has been ended (YES in step S65), the communication unit 103 of the communication terminal 10 transmits flight route finalization signals, indicating that the flight route has been finalized, to the flight route generating server 21 in step S79.

The processing of steps S80 and S81 in FIG. 14 are the same as the processing of steps S36 and S37 in FIG. 7, so description will be omitted.

Figure 15:
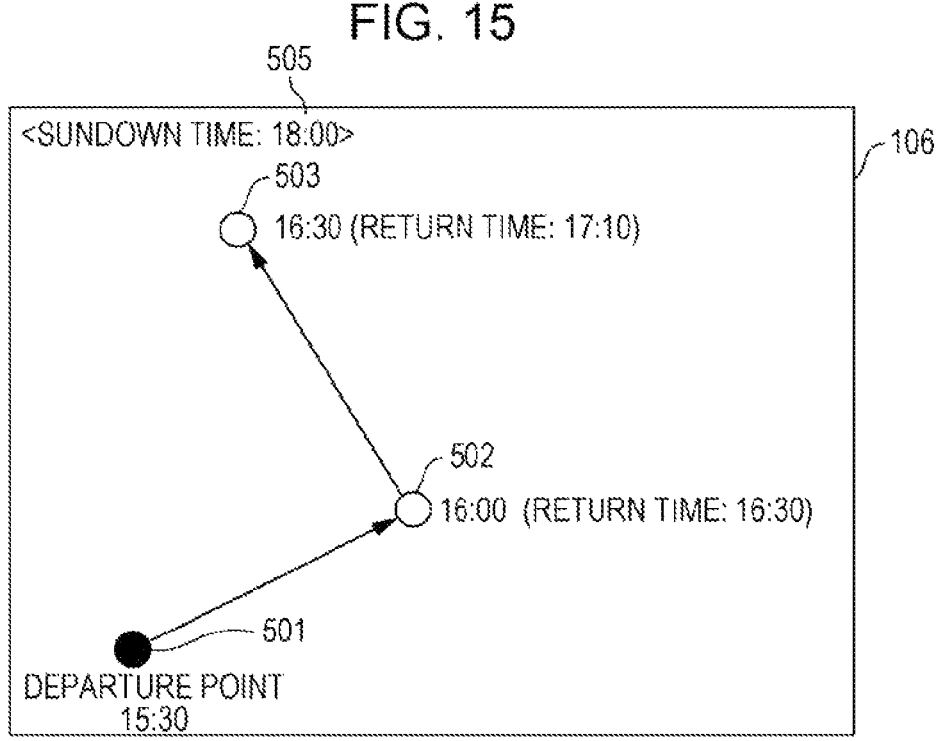
FIG. 15 is a diagram illustrating an example of a display screen displayed on a display unit of the communication terminal according to the second embodiment of the present disclosure.

FIG. 15 is a diagram illustrating an example of a display screen displayed on the display unit of the communication terminal according to the present second embodiment. As illustrated in FIG. 15, the display unit 106 displays the icon 501 that indicates the departure point, the icon 502 that indicates the first waypoint that is passed next after the departure point, and the icon 503 that Indicates the second waypoint that is passed next after the first waypoint, each input by the user, and the sundown time 505. The departure time ("15:30" in FIG. 15) is displayed near the icon 501.

The planned arrival time at which the unmanned aerial vehicle 40 will reach the first waypoint ("16:00" in FIG. 15) is displayed near the icon 502. The planned time of return ("16:30" in FIG. 15) at which the unmanned aerial vehicle 40 will return from the first waypoint to the departure point is also displayed.

The planned arrival time at which the unmanned aerial vehicle 40 will reach the second waypoint ("16:30" in FIG. 15) is displayed near the icon 503. The planned time of return ("17:10" in FIG. 15) at which the unmanned aerial vehicle 40 will return from the second waypoint to the departure point Is also displayed. Thus, the sundown time, and the planned time of returns of returning from each of the waypoints, are displayed when setting the flight route, so the user can be prompted to set the flight route to return by the sundown time, and the unmanned aerial vehicle 40 can be prevented from flying after the sundown time.

Note that when inputting the second waypoint, the user input unit 105 does not have to accept input of the second waypoint in a case where the second planned time of return of the unmanned aerial vehicle 40 returning from the second waypoint to the departure point is later than the end time (the sundown time). Also, when inputting the second waypoint, in a case where the second planned time of return of the unmanned aerial vehicle 40 returning from the second waypoint to the departure point is later than the end time (the sundown time), the display control unit 122 may notify the user that the second planned time of return is later than the end time. In a case where the second planned arrival time at the second waypoint that has been input is later than the sundown time, the display control unit 122 may display an icon illustrating the sundown point in the second embodiment, the same as in the first embodiment.

Figure 16:
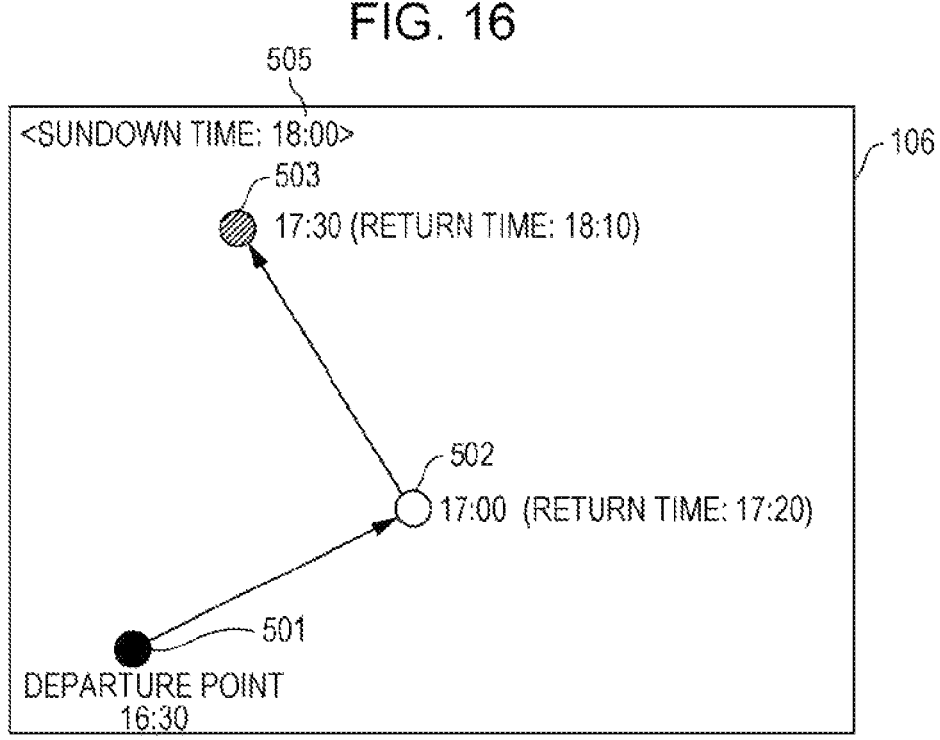
FIG. 16 is a diagram illustrating an example of a display screen displaying a waypoint from which the point of departure can be returned to by the sundown time and a waypoint from which the point of departure cannot be returned to by the sundown time in different modes according to the second embodiment of the present disclosure.

The display control unit 122 according to the present second embodiment may display waypoints on the flight route from which the departure point can be returned to by the end time (the sundown time) and waypoints from which the departure point cannot be returned to by the end time, in different modes. FIG. 16 is a diagram illustrating an example of a display screen displaying a waypoint from which the point of departure can be returned to by the sundown time and a waypoint from which the point of departure cannot be returned to by the sundown time in different modes, according to the present second embodiment.

As illustrated in FIG. 16, the display unit 106 displays the icon 501 that indicates the departure point, the icon 502 that indicates the first waypoint that is passed next after the departure point, and the icon 503 that indicates the second waypoint that is passed next after the first waypoint, each input by the user, and the sundown time 505. The departure time ("16:30" in FIG. 16) is displayed near the icon 501.

The planned arrival time at which the unmanned aerial vehicle 40 will reach the first waypoint ("17:00" in FIG. 16) is displayed near the icon 502. The planned time of return ("17:20" in FIG. 16) at which the unmanned aerial vehicle 40 will return from the first waypoint to the departure point is also displayed.

The planned arrival time at which the unmanned aerial vehicle 40 will reach the second waypoint ("17:30" in FIG. 16) is displayed near the icon 503. The planned time of return ("18:10" in FIG. 16) at which the unmanned aerial vehicle 40 will return from the second waypoint to the departure point is also displayed.

The icon 502 indicating the first waypoint from which the departure point can be returned to by the sundown time, and the icon 503 indicating the second waypoint from which the departure point cannot be returned to by the sundown time, may be displayed in different modes in FIG. 16. For example, the icon 502 and icon 503 may be displayed using different colors, or the icon 502 and icon 503 may be displayed using different shapes. Accordingly, the user can be made to comprehend whether or not the departure point can be returned to by the end time from the set waypoint.

Figure 17:
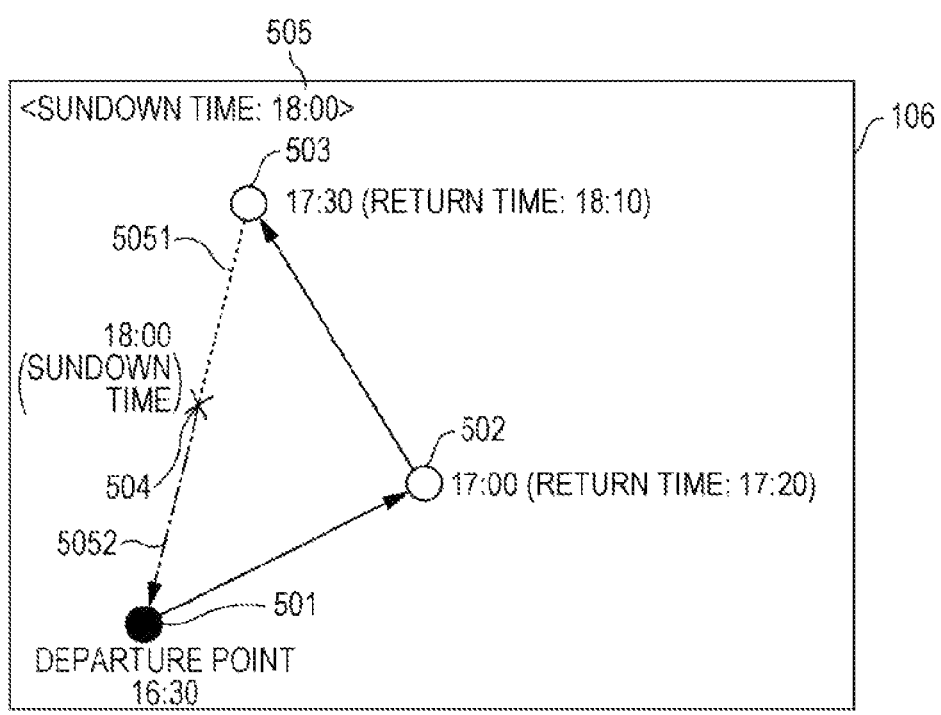
FIG. 17 is a diagram illustrating an example of a display screen displaying a return route for returning from a waypoint to a departure point, where a flight route from a waypoint to an end time arrival point and a flight route from the end time arrival point to the departure point are displayed in different modes according to the second embodiment of the present disclosure.

In the present second embodiment, the display control unit 122 may display, on a return route of returning from a waypoint to the departure point, a flight route from the departure point to the end time arrival point, and a flight route from the end time arrival point to the departure point, using different modes. FIG. 17 is a diagram illustrating an example of a display screen displaying a return route for returning from a waypoint to the departure point, where a flight route from a waypoint to the end time arrival point and a flight route from the end time arrival point to the departure point are displayed in different modes, according to the present second embodiment.

As illustrated in FIG. 17, the display unit 106 displays the icon 501 that indicates the departure point, the icon 502 that indicates the first waypoint that is passed next after the departure point, and the icon 503 that indicates the second waypoint that is passed next after the first waypoint, each input by the user, and the sundown time 505. The departure time ("16:30" in FIG. 17) is displayed near the icon 501.

The planned arrival time at which the unmanned aerial vehicle 40 will reach the first waypoint ("17:00" in FIG. 17) is displayed near the icon 502. The planned time of return ("17:20" in FIG. 17) at which the unmanned aerial vehicle 40 will return from the first waypoint to the departure point is also displayed.

The planned arrival time at which the unmanned aerial vehicle 40 will reach the second waypoint ("17:30" in FIG. 17) is displayed near the icon 503. The planned time of return ("18:10" in FIG. 17) at which the unmanned aerial vehicle 40 will return from the second waypoint to the departure point is also displayed.

In a case where the planned return time of returning from the second waypoint to the departure point is later than the sundown time, the icon 504 indicating the sundown point is displayed. The sundown time ("18:00 in FIG. 17) is displayed near the icon 504.

The icon 503 indicating the second waypoint and the icon 501 indicating the departure point are connected by an arrow. On the return route for returning from the second waypoint to the departure point, a flight route 5051 from the icon 503 indicating the second waypoint to the icon 504 indicating the sundown point is displayed as a dashed line, and a flight route 5052 from the icon 504 indicating the sundown point to the icon 501 indicating the departure point is displayed as a single-dot dashed line. Note that the flight route 5051 and flight route 5052 may be displayed using mutually different colors. Further, the flight route 5051 and flight route 5052 may be displayed using mutually different modes.

Accordingly, the user can comprehend a location that can be reached by the end time on a return route from the set waypoint to the departure point. How far can be reached by the end time can be comprehended, so the user will be able to go and collect the unmanned aerial vehicle 40 at the location that can be reached by the end time.

In the present second embodiment, the communication terminal 10 may have functions of the flight route generating server 21. That is to say, the communication terminal 10 may further include the second communication unit 204 and clock 205 of the flight route generating server 21. The control unit 102 of the communication terminal 10 may further include the communication control unit 221, planned arrival time calculating unit 222, flight route setting unit 224, and time of return calculating unit 225 of the flight route generating server 21. The storage unit 101 of the communication terminal 10 may further store the include the map information 211, the sundown time information 212, and traveling speed information 213 of the flight route generating server 21.

Third Embodiment

In cases of a disaster or an emergency, the unmanned aerial vehicle 40 may have to be flown even at nighttime after the sundown time. Accordingly, in a third embodiment, settings are accepted for a flight route even if the planned arrival time of a waypoint is later than the sundown time, in a case where permission has been obtained to fly the unmanned aerial vehicle 40 even after the sundown time.

Figure 18:
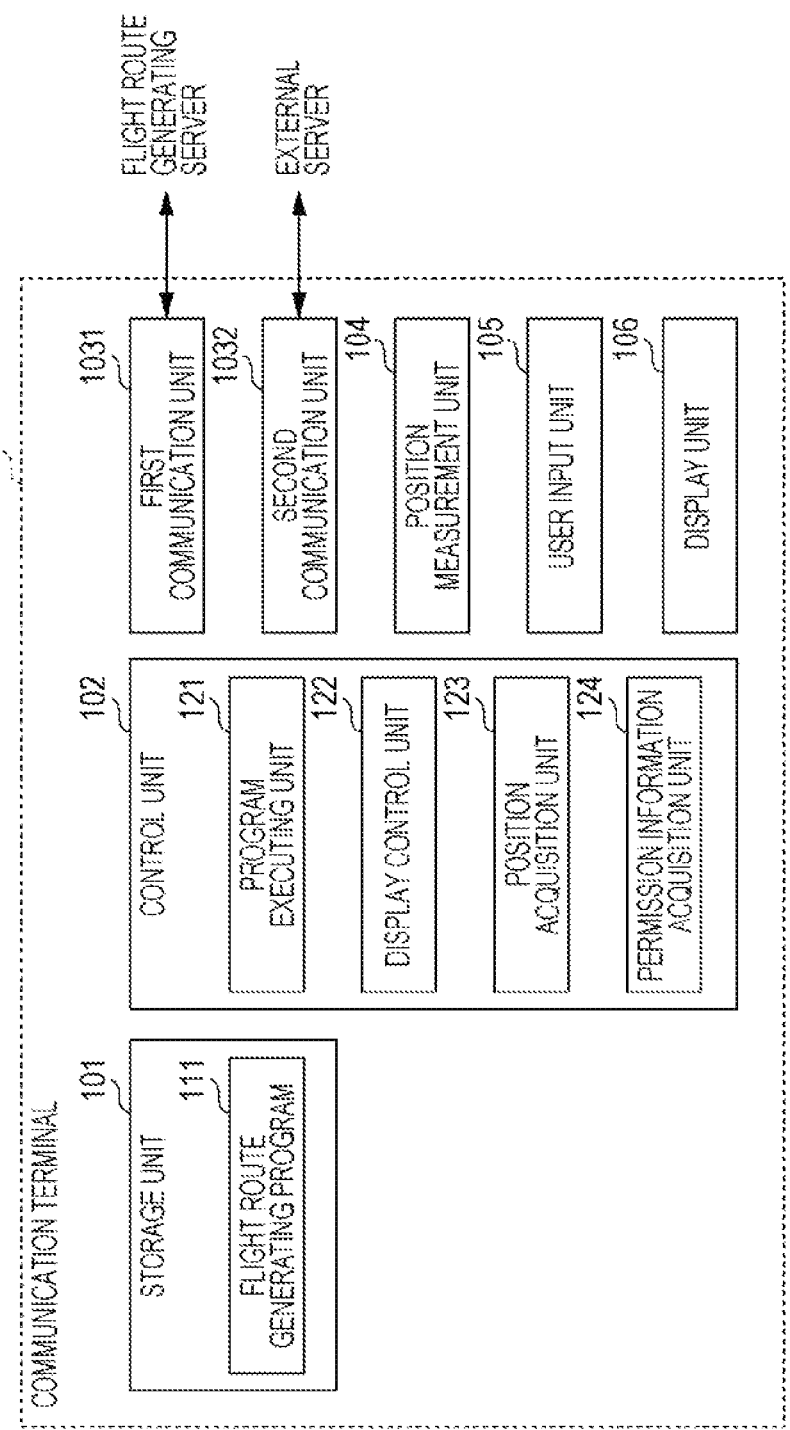
FIG. 18 is a block diagram illustrating the configuration of a communication terminal according to a third embodiment of the present disclosure.

FIG. 18 is a block diagram illustrating the configuration of a communication terminal 11 according to the third embodiment of the present disclosure. The communication terminal 11 illustrated in FIG. 18 includes the storage unit 101, control unit 102, position measurement unit 104, user input unit 105, display unit 106, and a first communication unit 1031 and second communication unit 1032. Note that components of the communication terminal 11 in the present third embodiment that are the same as the components of the communication terminal 10 according to the first embodiment illustrated in FIG. 4 are denoted with the same reference numerals, and detailed description will be omitted.

The first communication unit 1031 transmits various types of information to a flight route generating server 22 by a communication standard such as LTE or the like for example, and receives various types of information from the flight route generating server 22. The first communication unit 1031 has the same functions as the communication unit 103 in the first embodiment.

The second communication unit 1032 receives various types of information from the external server 30, via the Internet for example. The second communication unit 1032 receives permission information from the external server 30. Permission information is information permitting the flight of the unmanned aerial vehicle 40 after the end time (the sundown time). Note that the permission information may be input by the user using the user input unit 105. In this case, the second communication unit 1032 becomes unnecessary.

The control unit 102 is a CPU for example, and controls operations of the communication terminal 11. The control unit 102 includes the program executing unit 121, display control unit 122, position acquisition unit 123, and a permission information acquisition unit 124. The permission information acquisition unit 124 acquires permission information from the external server 30 via the second communication unit 1032. Note that the permission information acquisition unit 124 may acquire permission information input at the user input unit 105.

The first communication unit 1031 transmits the permission information acquired by the permission information acquisition unit 124 to the flight route generating server 22. The first communication unit 1031 receives verification results of the permission information transmitted by the flight route generating server 22. The verification results indicate whether or not the permission information is appropriate.

In a case of having acquired permission information permitting flight of the unmanned aerial vehicle 40 after the end time (the sundown time), the user input unit 105 accepts input of waypoints even if the planned arrival time of the unmanned aerial vehicle 40 arriving at the second waypoint is after the end time (the sundown time). In a case where verification results determining that the permission information is appropriate has been received by the first communication unit 1031, the user input unit 105 permits input of a second waypoint which will be arrived at a planned arrival time later than the end time (the sundown time). On the other hand, in a case where verification results determining that the permission information is inappropriate has been received by the first communication unit 1031, or the permission information acquisition unit 124 has not acquired permission information, the user input unit 105 does not accept input of a second waypoint which will be arrived at a planned arrival time later than the end time (the sundown time).

Figure 19:
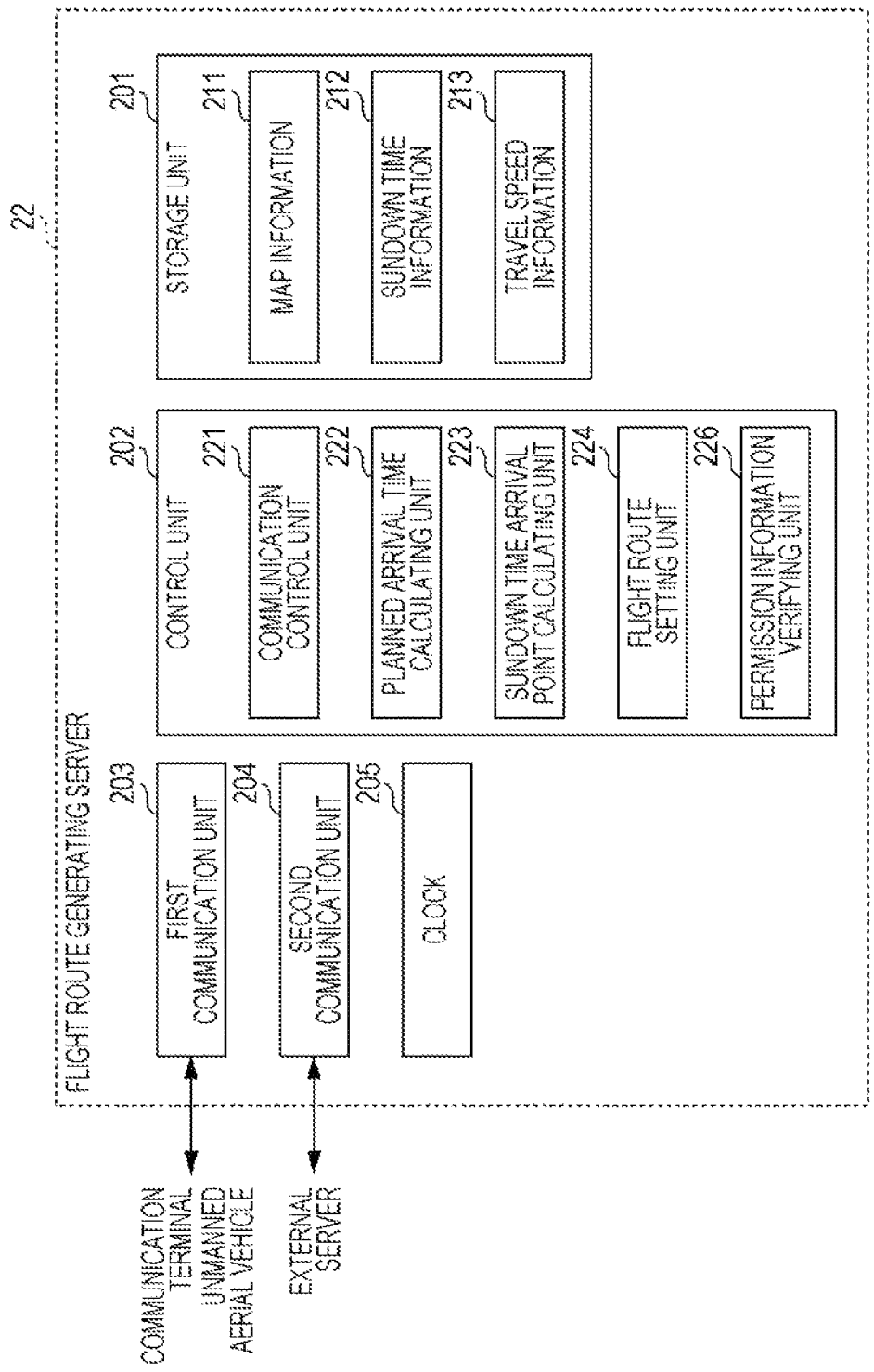
FIG. 19 is a block diagram illustrating the configuration of a flight route generating server according to the third embodiment of the present disclosure.

FIG. 19 is a block diagram illustrating the configuration of the flight route generating server 22 according to the present third embodiment of the present disclosure. The flight route generating server 22 illustrated in FIG. 19 includes the storage unit 201, control unit 202, first communication unit 203, second communication unit 204, and clock 205.

The control unit 202 is a CPU, for example, and controls operations of the flight route generating server 22. The control unit 202 includes the communication control unit 221, planned arrival time calculating unit 222, the sundown time arrival point calculating unit 223, flight route setting unit 224, and a permission information verifying unit 226. The permission information verifying unit 226 verifies the appropriateness of the permission Information transmitted from the communication terminal 11, and transmits the verification results thereof to the communication terminal 11.

Next, flight route generation processing performed by the communication terminal 11 and flight route generating server 22 in the present third embodiment will be described. First, the permission information acquisition unit 124 of the communication terminal 11 acquires permission information from the external server 30 via the second communication unit 1032. Next, the first communication unit 1031 transmits the permission information acquired by the permission information acquisition unit 124 to the flight route generating server 22. The first communication unit 203 of the flight route generating server 22 receives the permission information transmitted from the communication terminal 11.

Next, the permission information verifying unit 226 verifies whether the permission information received by the first communication unit 203 is appropriate or not. The permission information verifying unit 226 determines that the permission information is appropriate if officially issued, and determines that the permission information is inappropriate if not officially issued. The first communication unit 203 then transmits the verification results of the permission information verified by the permission information verifying unit 226 to the communication terminal 11.

The first communication unit 1031 of the communication terminal 11 then receives the verification results of the permission information transmitted from the flight route generating server 22. In a case where verification results that the permission information has been determined to be appropriate are received, the user input unit 105 accepts input of waypoints where the planned arrival time is later than the end time (the sundown time). Note that processing such as inputting departure point and waypoints, calculation of the planned arrival time and calculation of sundown point, and so forth, as the same as in the first embodiment, so description will be omitted.

Figure 20:
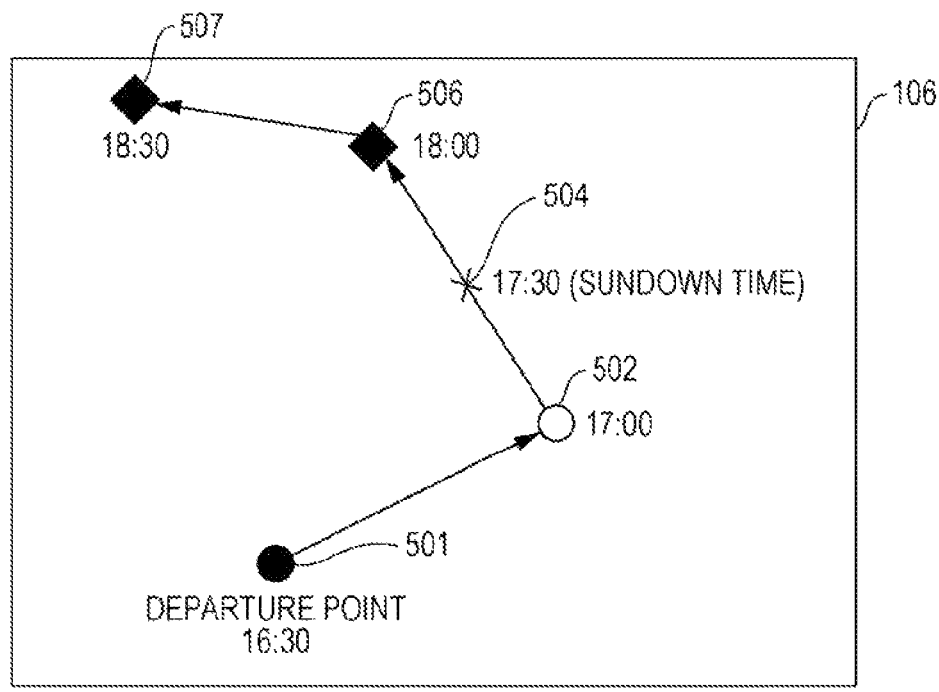
FIG. 20 is a diagram illustrating an example of a display screen displayed on a display unit of the communication terminal according to the third embodiment of the present disclosure.

FIG. 20 is a diagram illustrating an example of a display screen displayed on a display unit of the communication terminal according to the present third embodiment. As illustrated in FIG. 20, the display unit 106 displays an icon 501 that indicates the departure point, an icon 502 that indicates the first waypoint that is passed next after the departure point, an icon 506 that indicates the second waypoint that is passed next after the first waypoint, and an icon 507 that indicates a third waypoint that is passed next after the second waypoint, each having been input by the user. The departure time ("16:30" in FIG. 20) is displayed near the icon 501.

The planned arrival time at which the unmanned aerial vehicle 40 will reach the first waypoint (97:00" in FIG. 20) is displayed near the icon 502. In a case where the planned arrival time of arriving at the second waypoint that has been input is later than the sundown time, an icon 504 indicating the sundown point is displayed. The sundown time ("17:30 in FIG. 20) is displayed near the icon 504.

Permission information has been acquired in the example illustrated in FIG. 20, so the unmanned aerial vehicle 40 can be flown even after the sundown time. Accordingly, the second waypoint and third waypoint that will be reached after the sundown time can be set on the flight route. The icon 506 indicating the second waypoint and the icon 507 indicating the third waypoint may be displayed in a different mode from the icon 502 of the first waypoint that can be reached by the sundown time. That is to say, the form of the icon 506 and icon 507 may be different from the form of the icon 502.

Figure 21:
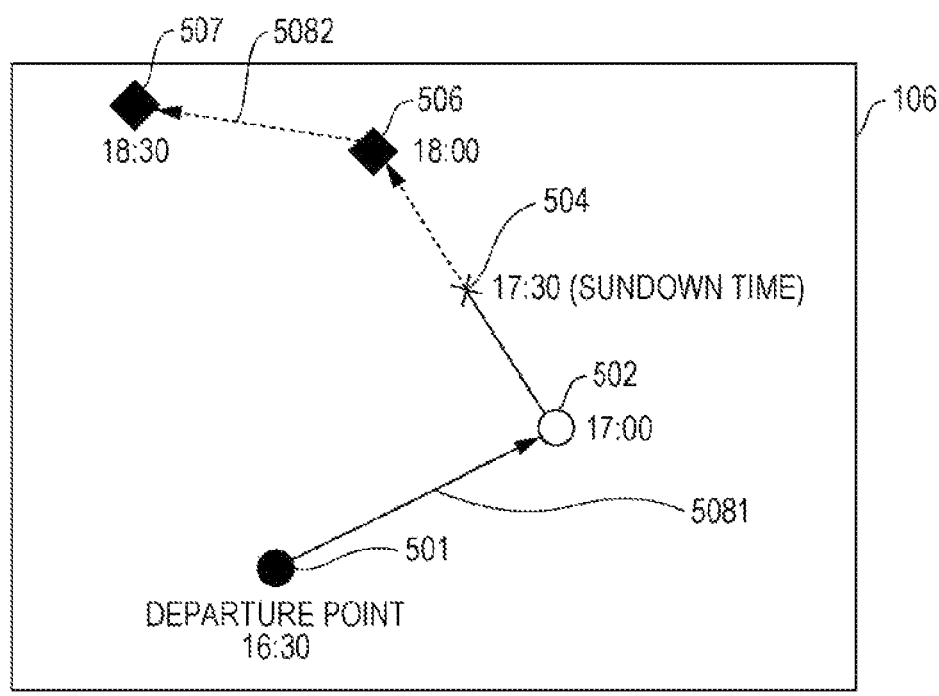
FIG. 21 is a diagram illustrating an example of a display screen displaying a flight route, where a flight route from a departure point to an end time arrival point and a flight route after the end time arrival point are displayed in different modes according to the third embodiment of the present disclosure.

Further, the display control unit 122 may display the part of the flight route from the departure point to the end time arrival point, and the remaining part of the flight route after the end time arrival point, in different modes in the present third embodiment. FIG. 21 is a diagram illustrating an example of a display screen displaying a flight route, where the flight route from the departure point to the end time arrival point and the flight route after the end time arrival point are displayed in different modes according to the present third embodiment.

Of the flight route, the flight route from the departure point to the sundown time, and the flight route after the sundown time, may be displayed in different modes. That is to say, an arrangement may be made such as illustrated in FIG. 21 for example, where a flight route 5081 from the icon 501 indicating the departure point to the icon 504 indicating the sundown point is displayed as a solid line, and a flight route 5082 from the icon 504 indicating the sundown point to the icon 507 indicating the third waypoint is displayed as a dashed line. The flight route 5081 may be displayed in blue and the flight route 5082 displayed in red. The flight route 5081 and the flight route 5082 may be displayed using different colors.

Fourth Embodiment

Figure 22:
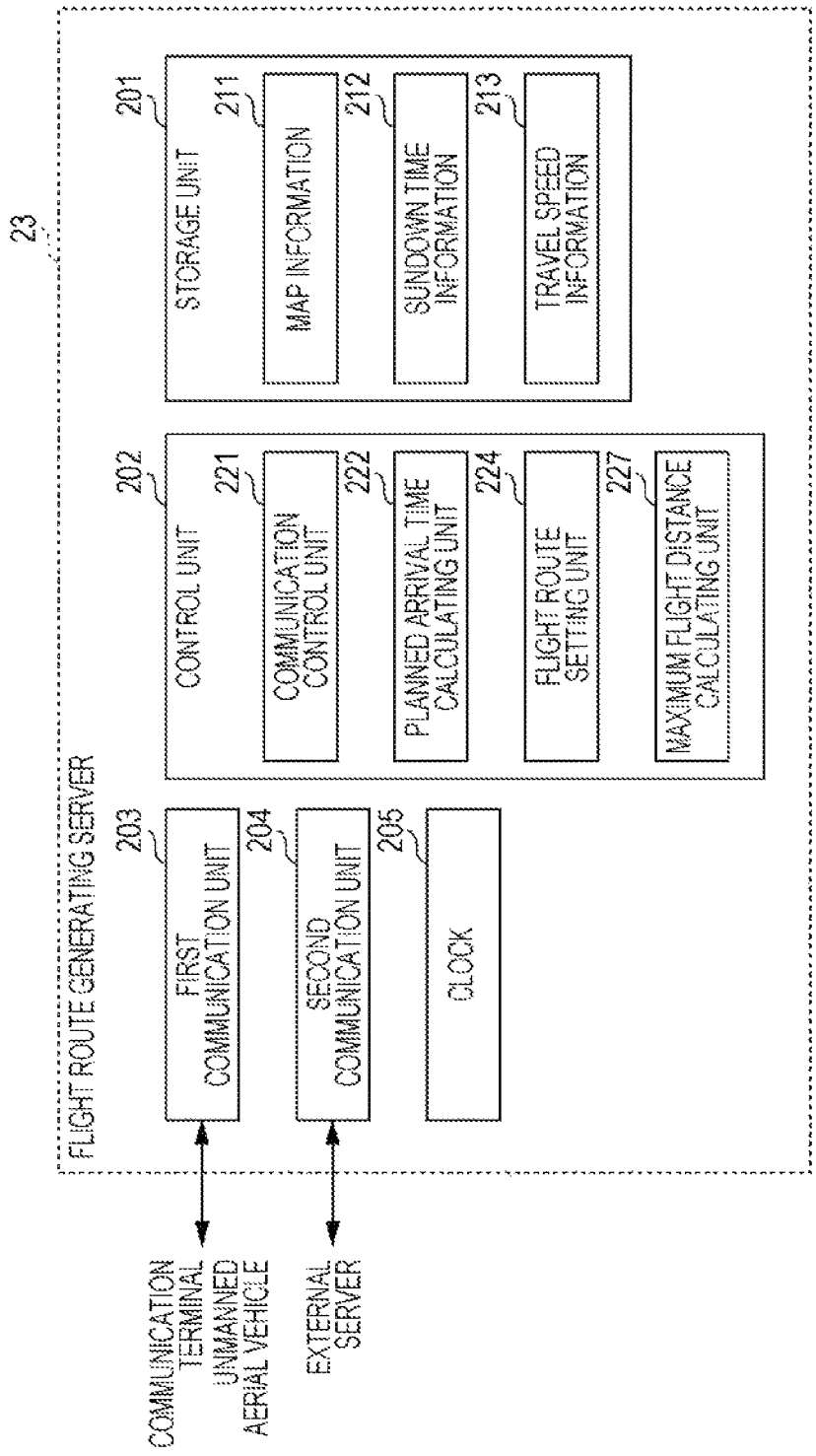
FIG. 22 is a block diagram illustrating the configuration of a flight route generating server according to a fourth embodiment of the present disclosure.

According to a fourth embodiment, the maximum distance that can be traveled from an input waypoint until the sundown time is displayed. FIG. 22 is a block diagram illustrating the configuration of a flight route generating server according to the fourth embodiment. The configuration of the communication terminal according to the present fourth embodiment is the same as the configuration of the communication terminal according to the first embodiment. Components of the flight route generating server 23 in the fourth embodiment that are the same as the components of the flight route generating server 20 according to the first embodiment illustrated in FIG. 5 are denoted with the same reference numerals, and detailed description will be omitted. The flight route generating server 23 illustrated in FIG. 22 has the storage unit 201, control unit 202, first communication unit 203, second communication unit 204, and clock 205.

The control unit 202 is a CPU for example, and controls operations of the flight route generating server 23. The control unit 202 includes the communication control unit 221, planned arrival time calculating unit 222, flight route setting unit 224, and a maximum flight distance calculating unit 227. The maximum flight distance calculating unit 227 calculates the maximum flight distance that the unmanned aerial vehicle 40 can cover from an input waypoint to the sundown time. The communication control unit 221 transmits the maximum flight distance calculated by the maximum flight distance calculating unit 227 to the communication terminal 10 via the first communication unit 203.

The communication unit 103 of the communication terminal 10 receives the maximum flight distance transmitted by the flight route generating server 23. The display control unit 122 of the communication terminal 10 displays a circular maximum flight range that is centered on the input waypoint and has a radius that is the maximum flight distance received by the communication unit 103. When the first waypoint is input, the display unit 106 displays the range that the unmanned aerial vehicle 40 can cover from the first planned arrival time at which the unmanned aerial vehicle 40 reaches the first waypoint, until the end time (the sundown time).

Figure 23:
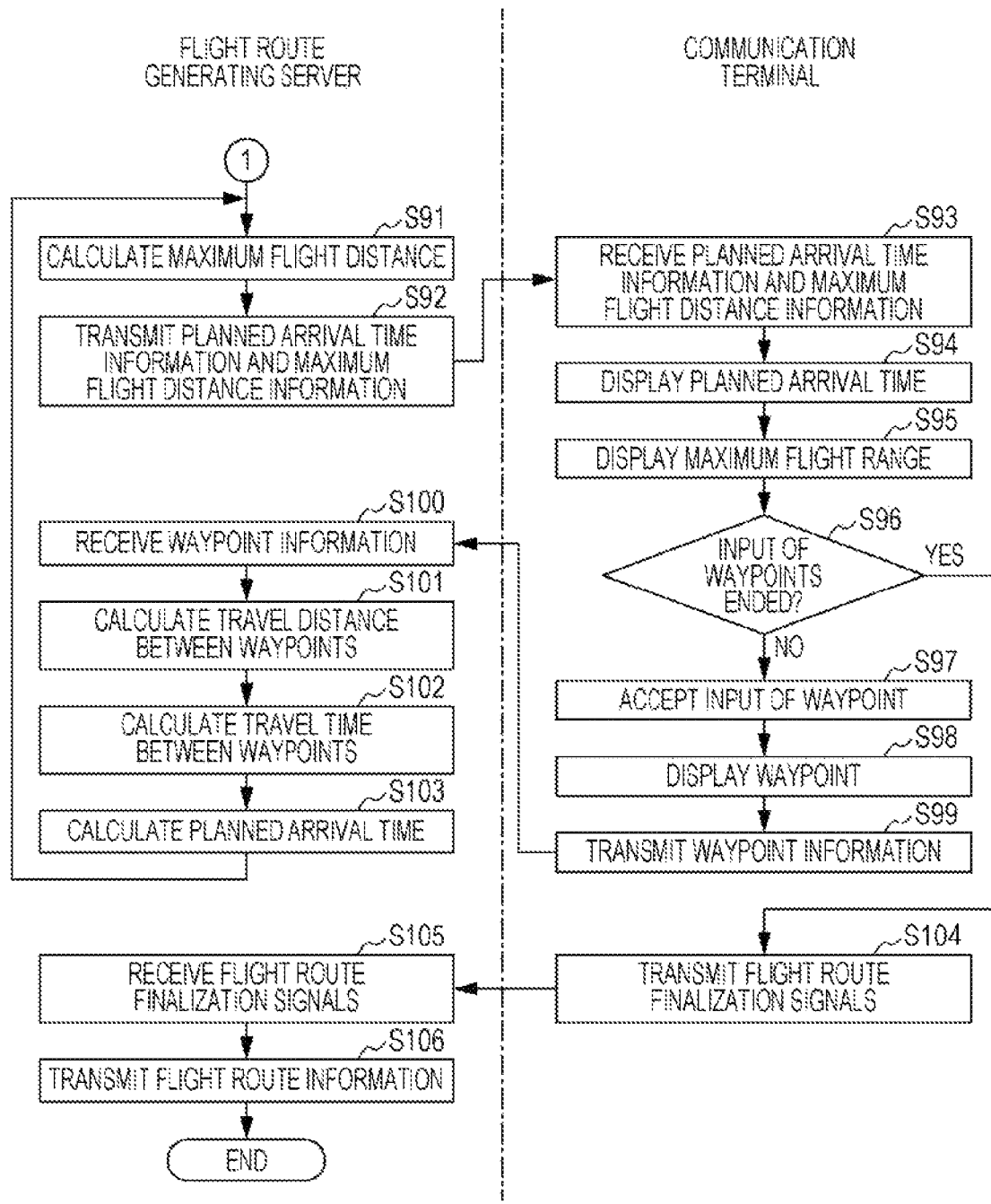
FIG. 23 is a flowchart for describing flight route generating processing of the communication terminal and flight route generating server according to the fourth embodiment of the present disclosure.

Next, the flight route generating processing by the communication terminal 10 and flight route generating server 23 according to the present fourth embodiment will be described. FIG. 23 is a flowchart for describing flight route generating processing of the communication terminal and flight route generating server according to the fourth embodiment of the present disclosure. Note that processing preceding step S91 is the same as the processing of step S1 through step S19 illustrated in FIG. 6, so description thereof will be omitted, and just the processing of step S91 and thereafter will be described.

In step S91, the maximum flight distance calculating unit 227 calculates the maximum flight distance that the unmanned aerial vehicle 40 can cover from the input waypoint until the sundown time, based on the planned arrival time, the sundown time, and the travel speed. That is to say, the maximum flight distance calculating unit 227 calculates the travel time from the planned arrival time to the sundown time, and multiples the calculated travel time by the travel speed, thereby calculating the maximum flight distance that the unmanned aerial vehicle 40 can cover from the waypoint to the sundown time.

Next, in step S92, the communication control unit 221 transmits planned arrival time information indicating the planned arrival time, and maximum flight distance information indicating the maximum flight distance to the communication terminal 10 via the first communication unit 203.

Next, in step S93, the communication unit 103 of the communication terminal 10 receives the planned arrival time information and maximum flight distance information transmitted by the flight route generating server 23.

The display control unit 122 then in step S94 displays the planned arrival time Indicated by the planned arrival time information nearby the icon representing the waypoint.

In step S95, the display control unit 122 displays a circular maximum flight range having a radius that is the maximum flight distance indicated by the maximum flight distance information, and centered on the icon indicating the waypoint.

The processing of step S96 through step S103 illustrated in FIG. 23 is the same as the processing of step S27 through step S34 illustrated in FIG. 7, so description will be omitted.

After the processing of step S103, the flow returns to the processing in step S91, and the maximum flight distance calculating unit 227 calculates the maximum flight distance that the unmanned aerial vehicle 40 can cover from the waypoint input this time to the sundown time, based on the planned arrival time, the sundown time, and travel speed.

Note that the display control unit 122 may display the maximum flight range corresponding to the waypoint Input this time, and the maximum flight range corresponding to the waypoint input the previous time, in step S95. The display control unit 122 may also display Just the maximum flight range corresponding to the waypoint input this time, without displaying the maximum flight range corresponding to the waypoint input the previous time.

In a case of determining in step S96 that input of waypoints has ended (YES in step S96), the flow advances to step S104, where the communication unit 103 of the communication terminal 10 transmits flight route finalization signals, indicating that the flight route has been finalized, to the flight route generating server 23.

The processing of steps S105 and S106 in FIG. 23 are the same as the processing of steps S36 and S37 in FIG. 7, so description will be omitted.

Figure 24:
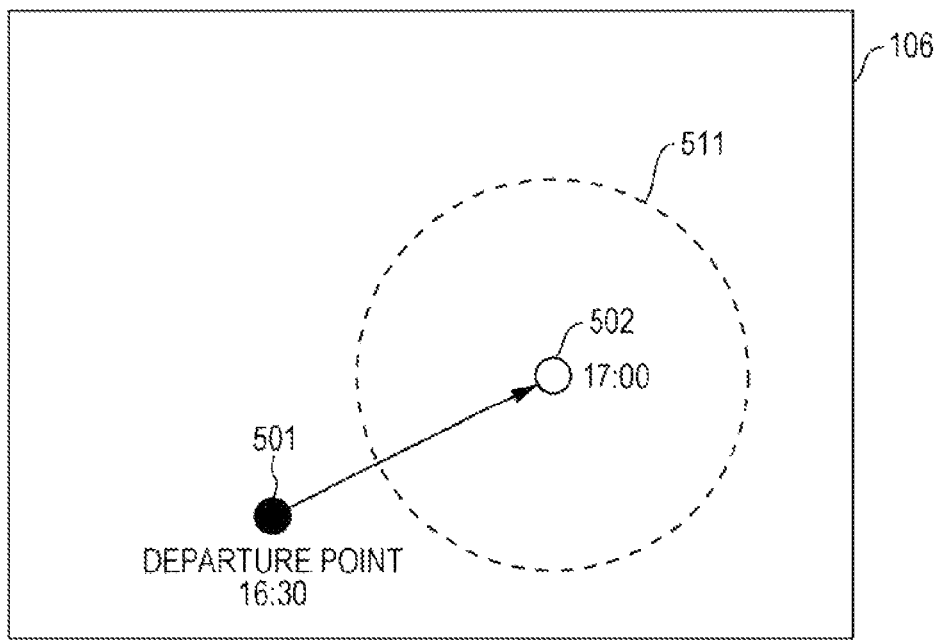
FIG. 24 is a diagram illustrating an example of a display screen displayed on a display unit of the communication terminal according to the fourth embodiment of the present disclosure.

FIG. 24 is a diagram illustrating an example of a display screen displayed on the display unit of the communication terminal according to the present fourth embodiment. As illustrated in FIG. 24, the display unit 106 displays the icon 501 that indicates the departure point, and the icon 502 that indicates the waypoint that is passed next after the departure point, each having been input by the user. The departure time ("16:30" in FIG. 24) is displayed near the icon 501.

The planned arrival time at which the unmanned aerial vehicle 40 will reach the waypoint ("17:00" in FIG. 24) is displayed near the icon 502. A circular maximum flight range 511 having a radius that is the maximum flight distance indicated by the maximum flight distance information, and centered on the icon 502 indicating the waypoint, is further displayed on the display unit 106.

Thus, the maximum flight range that can be covered from a waypoint to the sundown time is displayed when setting a flight route, so the user can be prompted to set the flight route to return by the sundown time. Accordingly, the unmanned aerial vehicle 40 can be prevented from flying after the sundown time.

Figure 25:
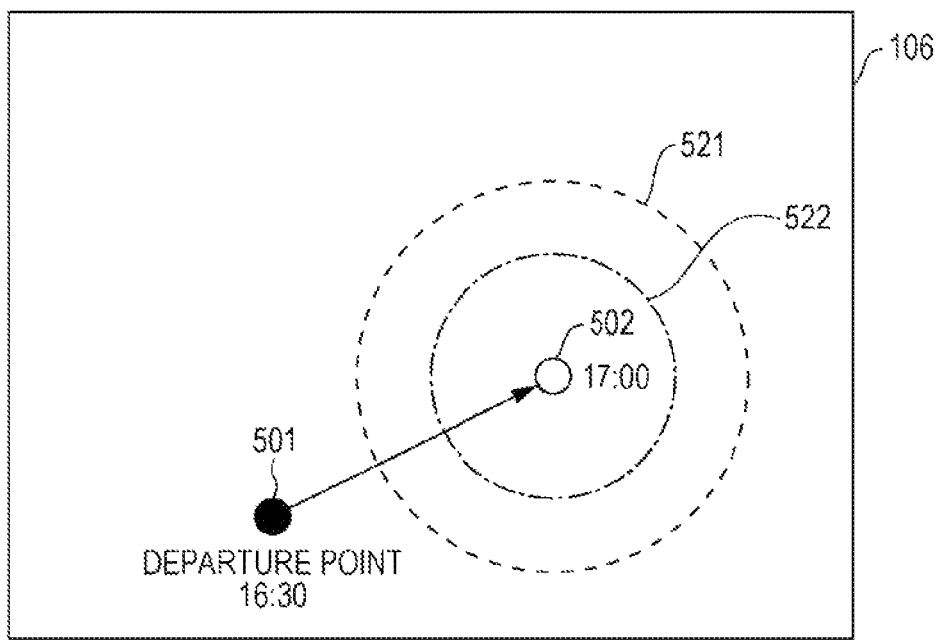
FIG. 25 is a diagram illustrating an example of a display screen displayed on a display unit of the communication terminal according to a modification of the fourth embodiment of the present disclosure.

Note that in the present fourth embodiment, the display unit 106 may display a maximum flight range that can be covered in accordance with the remaining charge of the battery of the unmanned aerial vehicle 40. FIG. 25 is a diagram illustrating an example of a display screen displayed on a display unit of the communication terminal according to a modification of present the fourth embodiment.

In a modification of the fourth embodiment, the display unit 106 displays a first maximum flight range 521 that the unmanned aerial vehicle 40 can cover from a waypoint until the sundown time, and a second maximum flight range 522 that the unmanned aerial vehicle 40 can cover in accordance with the remaining charge of the battery of the unmanned aerial vehicle 40. In this case, the flight route generating server 23 further has a remaining charge acquisition unit that acquires the remaining charge of the battery that the unmanned aerial vehicle 40 has. The remaining charge acquisition unit receives remaining battery charge information from the unmanned aerial vehicle 40 via the first communication unit 203.

The maximum flight distance calculating unit 227 calculates the first maximum flight distance that the unmanned aerial vehicle 40 can cover from the input waypoint until the sundown time. The maximum flight distance calculating unit 227 also calculates the second maximum flight distance that the unmanned aerial vehicle 40 can cover from the input waypoint in accordance with the remaining charge of the battery of the unmanned aerial vehicle 40. The communication control unit 221 transmits the first maximum flight distance and second maximum flight distance calculated by the maximum flight distance calculating unit 227 to the communication terminal 10 via the first communication unit 203.

The communication unit 103 of the communication terminal 10 receives the first maximum flight distance and the second maximum flight distance transmitted by the flight route generating server 23. The display control unit 122 of the communication terminal 10 displays a circular first maximum flight range centered on the input waypoint and of which the radius is the first maximum flight distance received by the communication unit 103. The display control unit 122 also displays a circular second maximum flight range centered on the input waypoint and of which the radius is the second maximum flight distance received by the communication unit 103. The display unit 106 may also display the second maximum flight range upon receiving input of a waypoint.

Next, the flight route generating processing of the communication terminal 10 and the flight route generating server 23 according to the modification of the present fourth embodiment will be described. Note that only processing that differs from the flight route generating processing according to the fourth embodiment described above will be described here.

Before step S91 in FIG. 23, the communication control unit 221 transmits a remaining charge request requesting the remaining charge of the battery to the unmanned aerial vehicle 40 via the first communication unit 203, and receives the remaining charge of the battery from the unmanned aerial vehicle 40.

Then in step S91 in FIG. 23, the maximum flight distance calculating unit 227 calculates the first maximum flight distance that the unmanned aerial vehicle 40 can cover from the input waypoint until the sundown time, based on the planned arrival time, sundown time, and the travel speed. The maximum flight distance calculating unit 227 also calculates the second maximum flight distance in accordance with the remaining charge of the battery indicated by the received remaining battery charge information. The storage unit 201 stores a table correlating the remaining charge of the battery and the second maximum flight distance. The maximum flight distance calculating unit 227 reads out the second maximum flight distance corresponding to the remaining charge of the battery, indicated by the received remaining battery charge information, from the storage unit 201.

Next, in step S92, the communication control unit 221 transmits planned arrival time information indicating the planned arrival time, first maximum flight distance information indicating the first maximum flight distance, and second maximum flight distance information indicating the second maximum flight distance, to the communication terminal 10 via the first communication unit 203.

Next, in step S93, the communication unit 103 of the communication terminal 10 receives the planned arrival time information, first maximum flight distance information, and second maximum flight distance information, transmitted by the flight route generating server 23.

Next, the display control unit 122 displays the planned arrival time, indicated by the planned arrival time information, nearby an icon representing the waypoint in step S94.

Then in step S95, the display control unit 122 displays the circular first maximum flight range 521 of which the radius is the first maximum flight distance indicated by the first maximum flight distance information and is centered on the icon representing the waypoint. The display control unit 122 also displays the circular second maximum flight range 522 of which the radius is the second maximum flight distance indicated by the second maximum flight distance information and is centered on the icon representing the waypoint.

Note that an arrangement may be made in the modification of the present fourth embodiment where, in a case that the second maximum flight distance that the unmanned aerial vehicle 40 can cover in accordance with the remaining charge of the battery is shorter than the first maximum flight distance that the unmanned aerial vehicle 40 can cover until the sundown time, the display control unit displays only the second maximum flight range 522 without displaying the first maximum flight range 521. The first maximum flight range 521 and the second maximum flight range 522 are preferably displayed in different modes.

In the present disclosure, all or part of the units, devices, members, and parts, and all or part of the functional blocks in the block diagrams illustrated in FIGS. 3, 4, 5, 12, 18, 19, and 22 may be executed by one or multiple electronic circuits including semiconductor devices, integrated circuits (IC), and large scale integration (LSI). LSIs and ICs may be integrated on a single chip, or may be configured as a combination of multiple chips. For example, functional blocks other than storage elements may be integrated on a single chip. Although the terms "LSI" and "IC" have been mentioned here, these are called by different terms depending on the degree of integration, and there are those called system LSI, very large scale integration (VLSI), and ultra large scale integration (ULSI), and these may be used as well. Field-programmable gate arrays (FPGA) that are programmed after manufacturing of the LSI, and reconfigurable logic devices where junction relations within the LSI can be reconfigured and circuit sections within the LSI can be set up, can also be used for the same purpose.

Also, functions and operations of all or part of the units, devices, members, and parts, may be realized by software processing. In this case, software is recorded in one or a plurality of non-transient recording media such as ROM, optical disc, hard disk drive, or the like. When the software is executed by a processor, functions specified by that software are executed by the processor and peripheral devices. A system or apparatus may have one or a plurality of non-transient recording media storing software, a processor, and necessary hardware devices, such as an interface for example.

The flight route generating method, flight route generating program, and flight route generating device, according to the present disclosure, can prompt a user to set a flight route to return by an end time of a time zone in which flying a unmanned aerial vehicle is permitted, can prevent the unmanned aerial vehicle from flying after the end time, and is useful as a flight route generating method for generating a flight route for a unmanned aerial vehicle to fly autonomously, a flight route generating program, and a flight route display device.

What is claimed is:

1. A method for controlling a flight route of an unmanned aerial vehicle that performs autonomous flight, the method comprising:
   accepting, by a touch panel display, an input of a departure point and a waypoint that the unmanned aerial vehicle will pass, wherein the input of the departure point and the waypoint is accepted by touching (i) a first certain point on a map which is displayed on the touch panel display and (ii) a second certain point on the map, wherein the first certain point is a point corresponding to the departure point, and wherein the second certain point is a point corresponding to the waypoint;
   receiving a predetermined time, indicating an end of a time period in which the unmanned aerial vehicle is permitted to fly;
   generating a flight route passing through the departure point and the waypoint;
   determining whether or not an arrival time to the waypoint is later than the predetermined time;
   not accepting the waypoint for the generated flight route when the arrival time is later than the predetermined time;
   accepting the waypoint for the generated flight route when the arrival time is not later than the predetermined time; and
   transmitting a control command to the unmanned aerial vehicle, the control command controlling the unmanned aerial vehicle to fly according to the generated flight route.

2. The method according to claim 1, further comprising:
   changing, when the arrival time is later than the predetermined time, a departure time from the departure point so that the predetermined time is later than the arrival time.

3. The method according to claim 1, further comprising:
   changing, when the arrival time is later than the predetermined time, a travel speed of the unmanned aerial vehicle so that the predetermined time is later than the arrival time.

4. The method according to claim 1, further comprising:
   accepting an input of the waypoint even if the arrival time is later than the predetermined time, in a case where permission information has been acquired, the permission information permitting the unmanned aerial vehicle to fly after the predetermined time.

5. The method according to claim 1, further comprising:
   displaying, on the touch panel display, a reachable flight range of the unmanned aerial vehicle from the arrival time until the predetermined time, when inputting the waypoint.

6. The method according to claim 1, further comprising:
   acquiring a remaining charge of a battery that the unmanned aerial vehicle has; and
   displaying, on the touch panel display, a reachable flight range of the unmanned aerial vehicle from the waypoint on the remaining charge, when inputting the first waypoint.

7. A method for controlling a flight route of an unmanned aerial vehicle that performs autonomous flight, the method comprising:
   accepting, by a touch panel display, an input of a departure point and a waypoint that the unmanned aerial vehicle will pass, wherein the input of the departure point and the waypoint is accepted by touching (i) a first certain point on a map which is displayed on the touch panel display and (ii) a second certain point on the map, wherein the first certain point is a point corresponding to the departure point, and wherein the second certain point is a point corresponding to the waypoint;
   receiving a predetermined time, indicating an end of a time period in which the unmanned aerial vehicle is permitted to fly;
   generating a flight route passing through the departure point and the waypoint;
   determining whether or not an arrival time to the waypoint is later than the predetermined time;
   notifying a user that the arrival time will be later than the predetermined time, in response to determining that the arrival time is later than the predetermined time; and
   transmitting a control command to the unmanned aerial vehicle, the control command controlling the unmanned aerial vehicle to fly according to the generated flight route.

8. The method according to claim 7, further comprising:
   changing, when the arrival time is later than the predetermined time, a departure time from the departure point so that the predetermined time is later than the arrival time.

9. The method according to claim 7, further comprising:
   changing, when the arrival time is later than the predetermined time, a travel speed of the unmanned aerial vehicle so that the predetermined time is later than the arrival time.

10. The method according to claim 7, further comprising:
    accepting an input of the waypoint even if the arrival time is later than the predetermined time, in a case where permission information has been acquired, the permission information permitting the unmanned aerial vehicle to fly after the predetermined time.

11. The method according to claim 7, further comprising:
    displaying, on the touch panel display, a reachable flight range of the unmanned aerial vehicle from the arrival time until the predetermined time, when inputting the waypoint.

12. The method according to claim 7, further comprising:
    acquiring a remaining charge of a battery that the unmanned aerial vehicle has; and displaying, on the touch panel display, a reachable flight range of the unmanned aerial vehicle from the waypoint on the remaining charge, when inputting the first waypoint.

\* \* \* \* \*